Oct. 3, 1967    KAZUHIKO TAKEMURA ETAL    3,344,594
AUTODOFFING APPARATUS
Filed Oct. 29, 1964    19 Sheets-Sheet 1

Kazuhiko Takemura
Tetsutaro Noguchi,
INVENTORS

BY Wenderoth,
Lind & Ponack ATTORNEYS

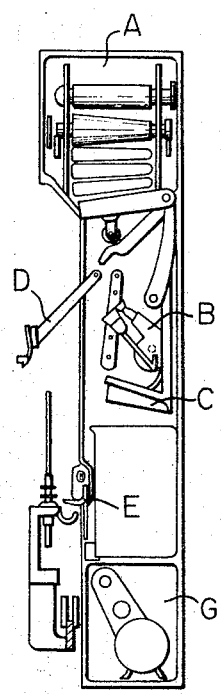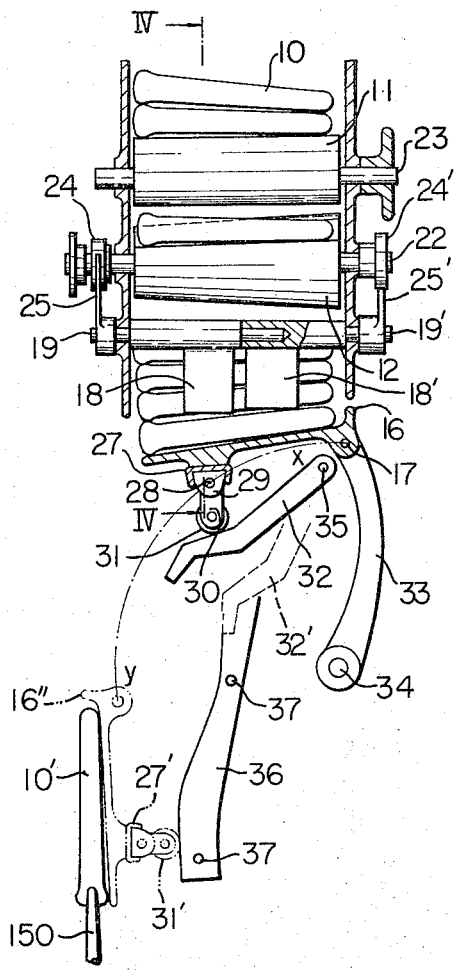

Fig. 7
Fig. 8
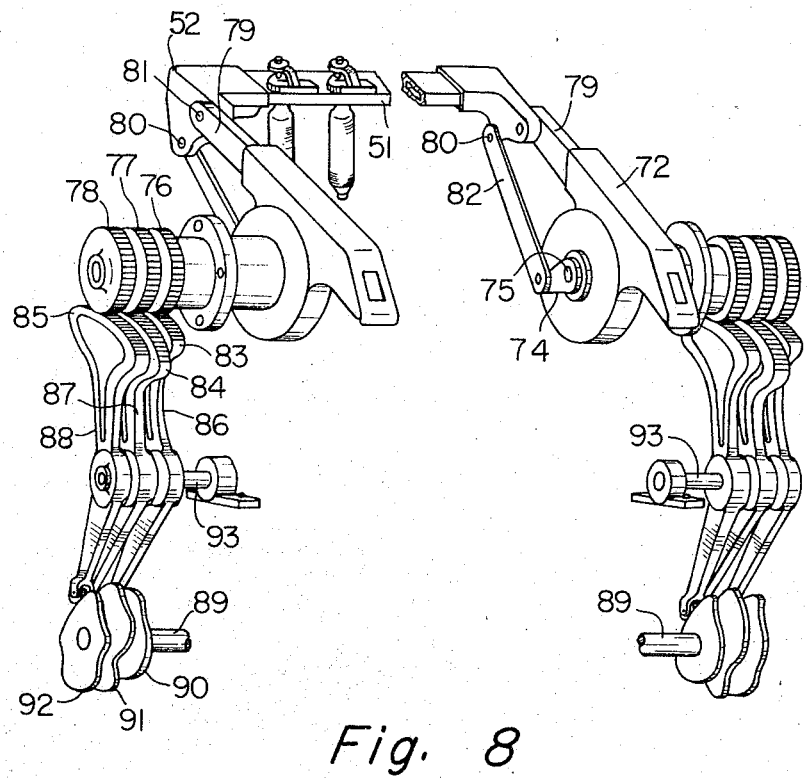
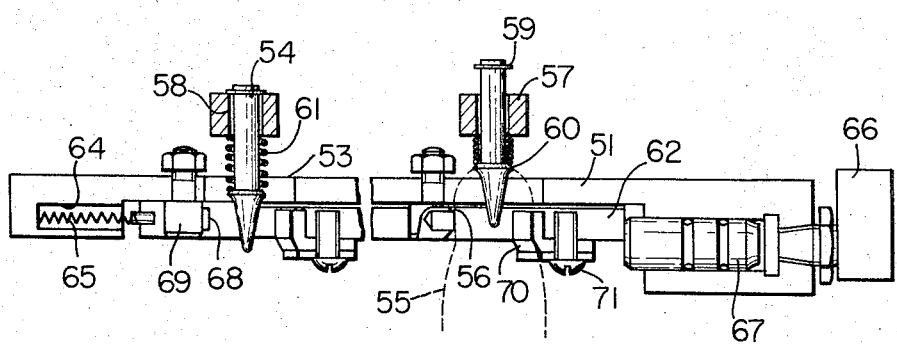

Oct. 3, 1967　　KAZUHIKO TAKEMURA ET AL　　3,344,594
AUTODOFFING APPARATUS
Filed Oct. 29, 1964　　　　　　　　　　　　　19 Sheets-Sheet 6

Kazuhiko Takemura
and Tetsutaro Noguchi
INVENTORS

BY Wenderoth,
Lind and Ponack, ATTORNEYS

Fig. 15
Fig. 16
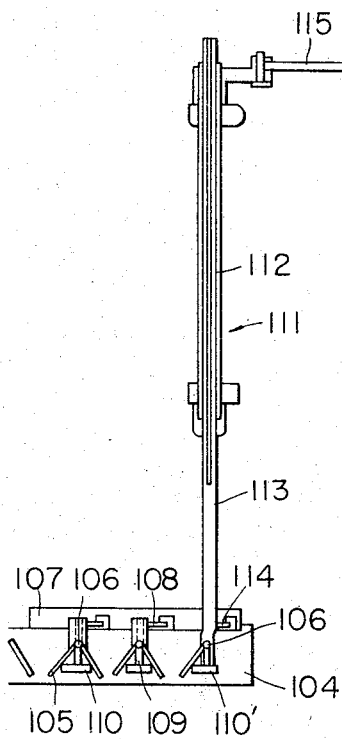
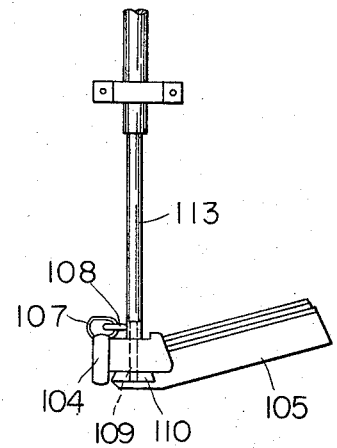
Fig. 17
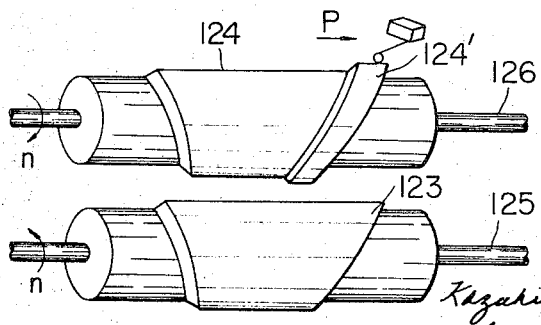

Oct. 3, 1967 KAZUHIKO TAKEMURA ETAL 3,344,594
AUTODOFFING APPARATUS
Filed Oct. 29, 1964 19 Sheets-Sheet 9

Oct. 3, 1967  KAZUHIKO TAKEMURA ETAL  3,344,594
AUTODOFFING APPARATUS
Filed Oct. 29, 1964  19 Sheets-Sheet 15

Kazuhiko Takemura
and Tetsutaro Noguchi
INVENTORS

BY Wenderoth,
Lind and Ponack, ATTORNEYS

Oct. 3, 1967  KAZUHIKO TAKEMURA ET AL  3,344,594
AUTODOFFING APPARATUS
Filed Oct. 29, 1964  19 Sheets-Sheet 16
Fig. 37
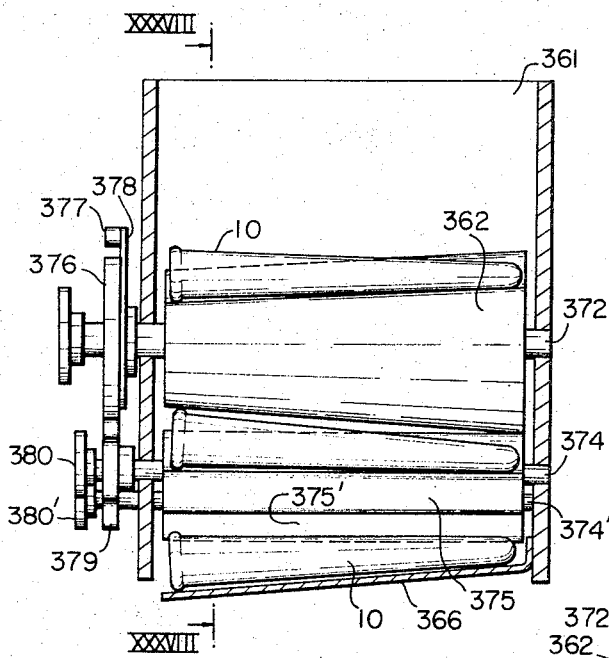
Fig. 38
Fig. 39
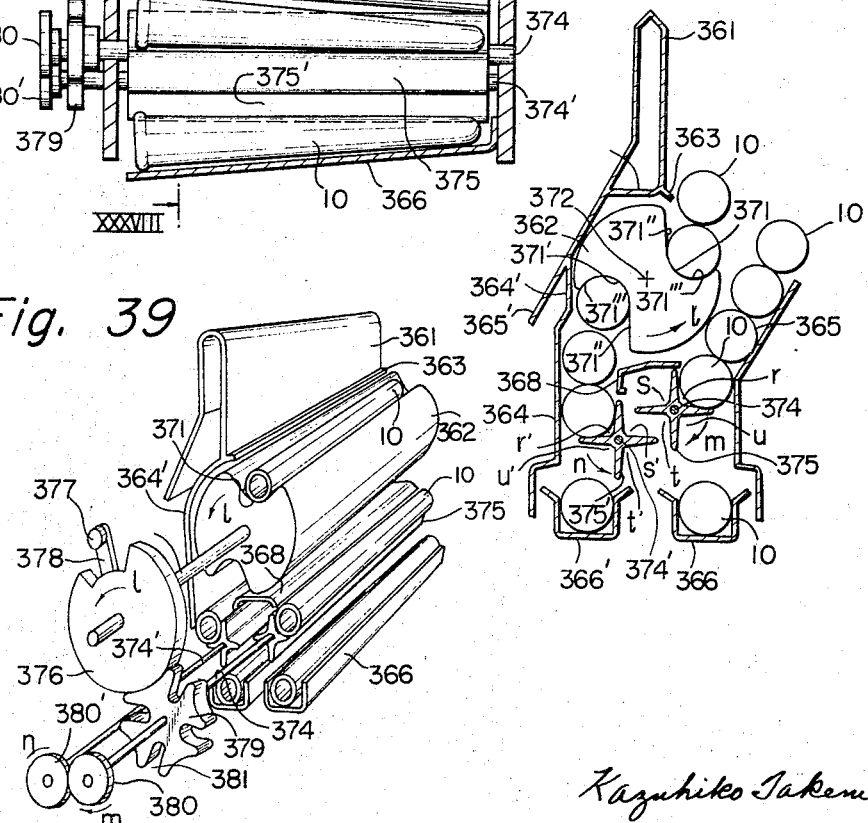
Kazuhiko Takemura
and Tetsutaro Noguchi
INVENTORS
BY Wenderoth,
Lind and Ponack ATTORNEYS 3,344,594
AUTODOFFING APPARATUS
Kazuhiko Takemura, Takatsuki-shi, and Tetsutaro Noguchi, Fukuno-Machi, Japan, assignors to Kureha Spinning Co., Ltd., Osaka, and Toyama Machine Works, Ltd., Toyama-ken, Japan, both corporations of Japan
Filed Oct. 29, 1964, Ser. No. 407,493
Claims priority, application Japan, Oct. 31, 1963, 38/57,668; Dec. 5, 1963, 38/65,072
14 Claims. (Cl. 57—53)

ABSTRACT OF THE DISCLOSURE

An apparatus to doff simultaneously a plurality of full wound bobbins from the spindles of a textile machine and thereafter to mount simultaneously a plurality of empty bobbins on the spindle from which the bobbins just have been removed. The apparatus is also adapted to travel in front of the textile machine and to stop at a predetermined position for exchanging the bobbins.

Figure 1:
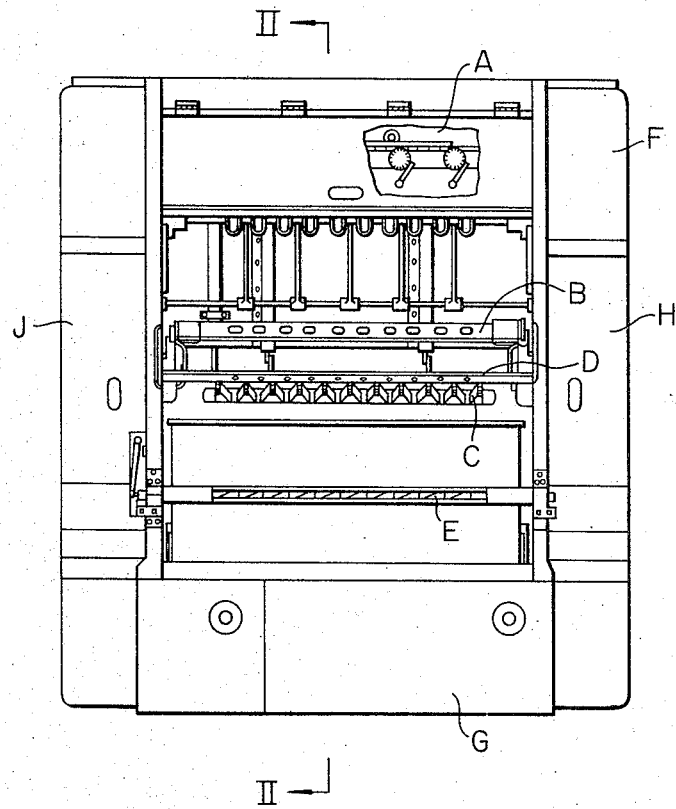

This invention relates to an automatic bobbin exchanging apparatus and method in which said apparatus moves along the front of the shafts of spindles of a spinning machine, twister or the like and at a prescribed distance simultaneously removes a plurality of full wound bobbins from their spindles, deposits the removed bobbins in a bobbin case, then impales a set of empty bobbins on the spindles from which the full wound bobbins have been removed, and thereafter repeats the foregoing operation successively at prescribed intervals, thereby effecting the automatic doffing of the full wound bobbins.

The dismounting of full wound bobbins or cops from the spindles and the mounting of empty bobbins thereon in the spinning operation have in the past been carried out chiefly by manual operations. The manpower assigned to these tasks amounts to substantial proportion of that assigned to the whole spinning operation. It is now gradually becoming difficult to obtain at low wages the personnel required for doffing the full wound bobbins from the spindles and impaling empty bobbins on these spindles as well as the various other steps involved in these operations. Accordingly, with the automation of the various processing steps in the spinning operation taking place, the automation of the spinning step, and particularly the exchanging of bobbins, has been an ardent desire of the trade. Thus, numerous proposals have been made in this connection. The doffing of one full wound bobbin at a time from each of the spindles is disclosed in U.S. Patents 2,570,057 and 2,661,589. On the other hand, U.S. Patents 2,952,113 and 2,962,856 disclose ways of loosening the bobbin from its spindle and methods of handling the bobbin. Further, U.S. Patent 2,886,940 makes a proposal concerning an apparatus which while traveling along the front of a line of spindles removes one bobbin at a time from each of the spindles on which spindles it then mounts one empty bobbin at a time.

The present invention is directed to an apparatus for automatically exchanging the bobbins, which apparatus being carried on either both sides or one side of a carriage which travels alongside the gear end or out end of spinning machines arranged in parallel in a mill, is adapted to be transferred from the carriage which stops at the gear end or out end of the spinning machine from which full wound bobbins are to be doffed, to rails mounted along the front of the spinning machine over which it then moves to stop after traveling a prescribed distance, removes simultaneously a plurality of full wound bobbins or cops from their spindles, then discharges the removed bobbins to a bobbin case provided in the apparatus, followed by mounting a plurality of empty bobbins on the plurality of bared spindles, and thereafter repeats the same operation as it stops successively at prescribed intervals until the end of the spinning machine is reached where, after completing the exchange of bobbins, it immediately returns to its starting point, i.e., the carriage at the gear end or out end of the spinning machine.

It is therefore an object of the present invention to provide an apparatus for automatically dismounting full wound bobbins and mounting in their stead empty bobbins, the apparatus being one in which at prescribed intervals along the front of a spinning machine a plurality of full wound bobbins are simultaneously removed from their spindles and discharged into a bobbin case provided in the apparatus, empty bobbins equal in number to those removed are supplied from a bobbin supplying means provided in the apparatus and simultaneously mounted on the bared spindles, and thereafter this same operation is repeated at the successive prescribed intervals (this apparatus to be hereinafter referred to as KAD).

Another object of the invention is to provide a KAD equipped with a lappet reversing means and a bobbin loosening means for removing a plurality of full wound bobbins simultaneously from their spindles.

A still another object of this invention is to provide a KAD equipped with a bobbin chucking means for removing a plurality of full wound bobbins simultaneously from their spindles, the bobbin chucking means being so adapted that it holds the heads of a plurality of bobbins simultaneously and discharges the held bobbins all together at the same time.

A further object of the invention is to provide a KAD equipped with a bobbin holding means which receives the plurality of full wound bobbins which have been removed from their spindles and discharges these bobbins into the bobbin case, the stroke of descent of said holding means into the bobbin box being variable.

A still further object of the invention is to provide a KAD equipped with a means for supplying empty bobbins to the spindles, said means being one in which a plurality of supplying means for feeding empty bobbins to the spindles are provided and the empty bobbins are fed to the spindles while being moved from their horizontal position along a prescribed locus to assume a vertical position when being impaled on the spindles.

An additional object is to provide a KAD equipped with a means wherein immediately after the full wound bobbins are removed from their spindles the empty bobbins are mounted thereon so that the removing and mounting of the bobbins are promptly carried out in one cycle without any overlapping occurring in a greater part of their loci.

A still additional object of the invention is to provide a KAD equipped with a means whereby the spinning machine is immediately started up when the KAD starts to revert to its initial starting position immediately after it has completed the exchanging of all the bobbins of a spinning machine by traveling to the end thereof after having repeated successively at prescribed intervals along the front of the spinning machine the cycle consisting of the doffing of the full wound bobbins from their spindles and then the mounting thereon of empty bobbins.

A further object of the invention is to provide a KAD wherein the power required for its travel along the front of the spinning machine and that required for exchanging the bobbins are provided by a single electric motor by means of a switching means.

Another object of the invention is to provide a KAD carried by a carriage traveling alongside the series of gear ends or out ends of spinning machines and capable of being moved to any one of the spinning machines at which doffing operations are to be performed.

A still another object is to provide a method of exchanging full wound bobbins on the spindles for empty bobbins by means of a KAD in accordance with a given system.

The foregoing objects are achieved by the application of the invented apparatus to a spinning mill, with the consequence that the productive efficiency of a mill is enhanced since the dismounting of full wound bobbins from their spindles and mounting of empty bobbins thereon in a spinning machine can be carried out without the need for manual labor.

Although there are some among this type of apparatus in which the apparatus is caused to travel overhead and is stopped above the spinning machine to perform the bobbin exchanging operation from above, the installation of such an apparatus in a mill would of necessity require a change in the construction of the ceiling. Further, in an apparatus in which the bobbin supplying means holds the empty bobbins in a vertical position and feeds the bobbins to the spindles from this vertical position, the height of the bobbin supplying means becomes great, even though the apparatus does not travel overhead. The invented apparatus does not travel overhead and hence there is no need for altering the ceiling. Further, as the empty bobbins are held in the bobbin supplying means in their horizontal position, the overall height of the apparatus does not become great.

Since the invented apparatus is set up as hereinbefore described and, as hereinafter disclosed, the various means are contained in a highly confined space, the apparatus has an exceedingly small volume. Thus, it is possible for the invented apparatus to travel and stop along the front of a spinning machine and accomplish the automatic exchanging of bobbins, without the need for particularly widening the space between the rows of spinning machines.

For a clearer understanding, the invention will be hereinafter described with reference being had to the accompanying drawings. The invention is however not to be limited to that illustrated in the drawings and described herein but is to include all variations and modification within the spirit of the invention and scope of the appended claims.

Figure 4:
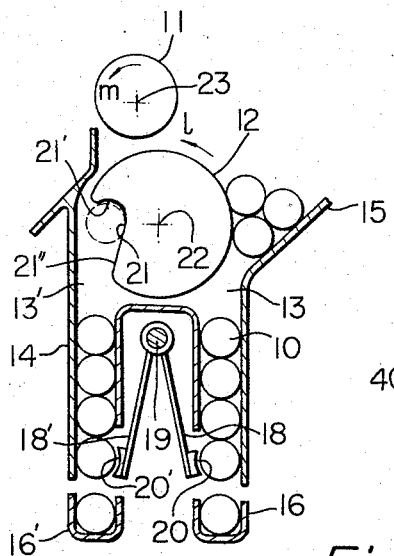
Figure 6:
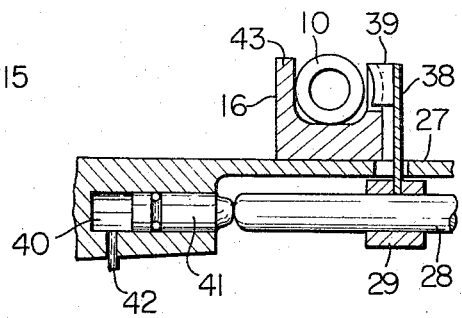
Figure 5:
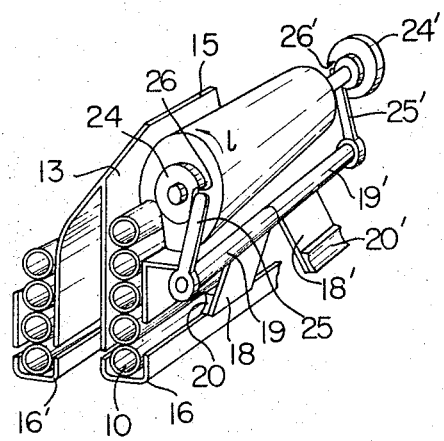
Figure 9:
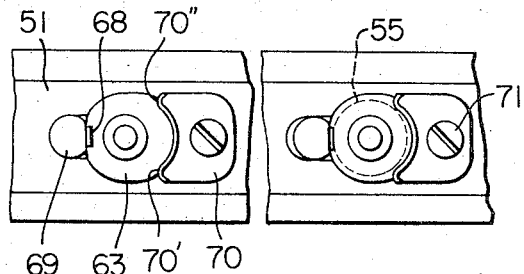
Figure 10:
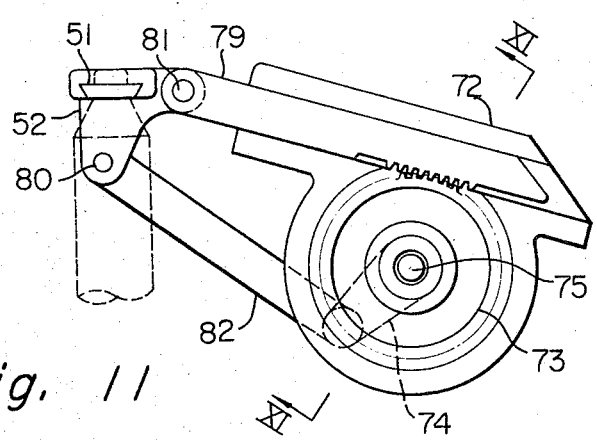
Figure 11:
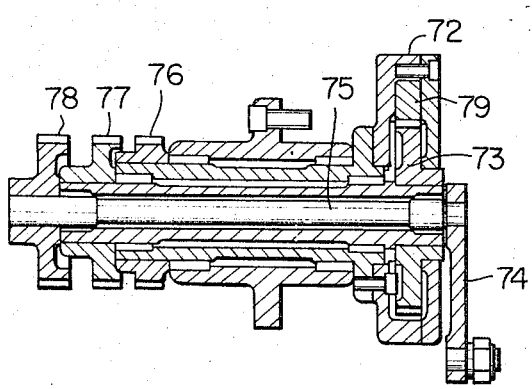
Figure 12:
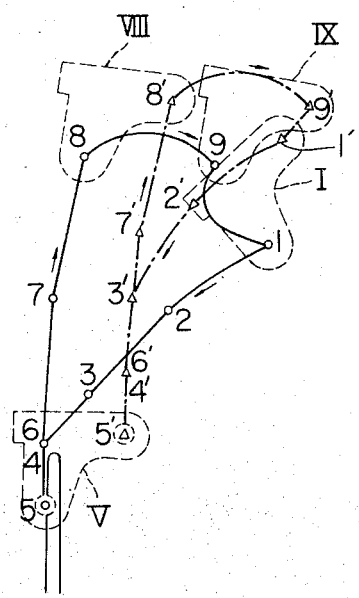
Figure 13:
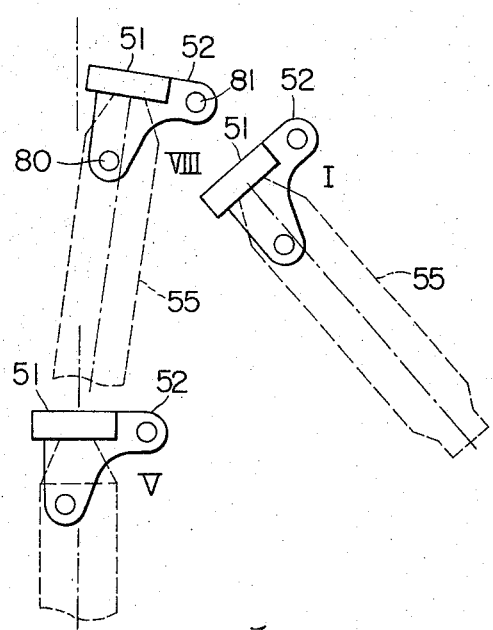
Figure 14:
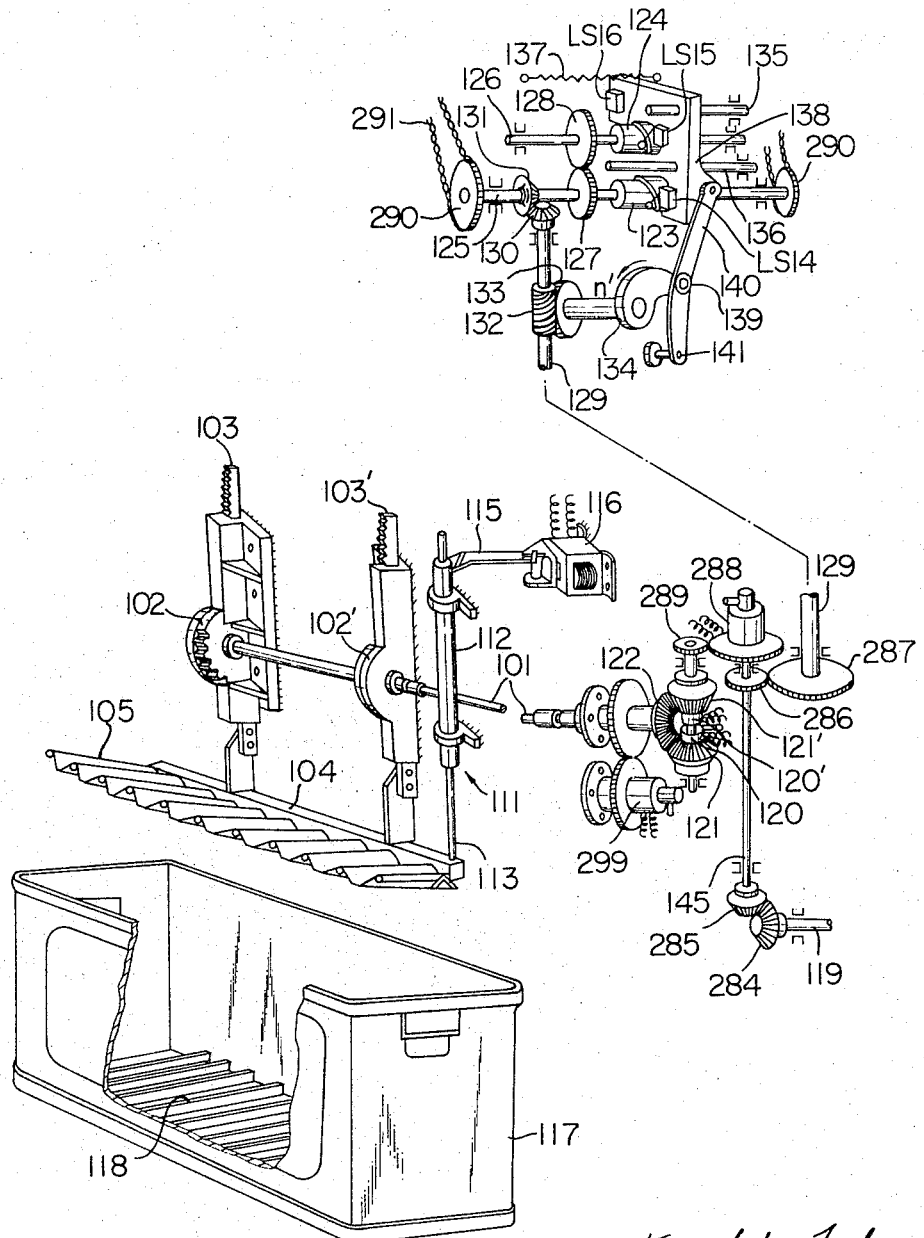
Figure 18:
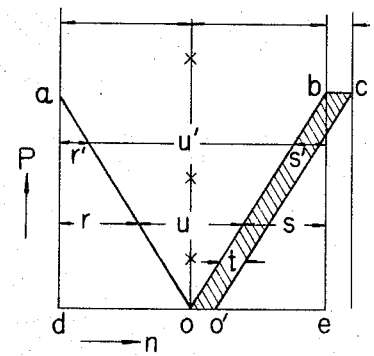
Figure 19:
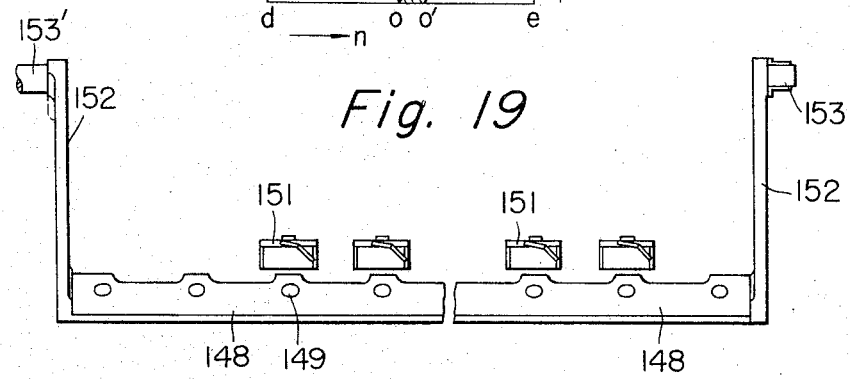
Figure 20:
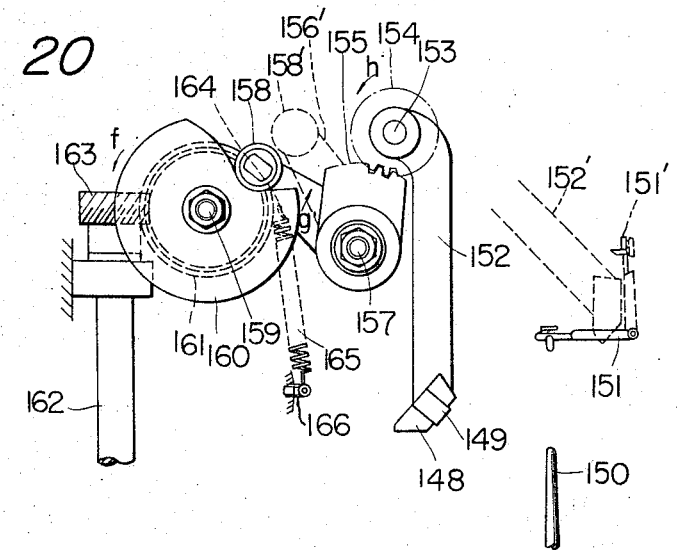
Figure 21:
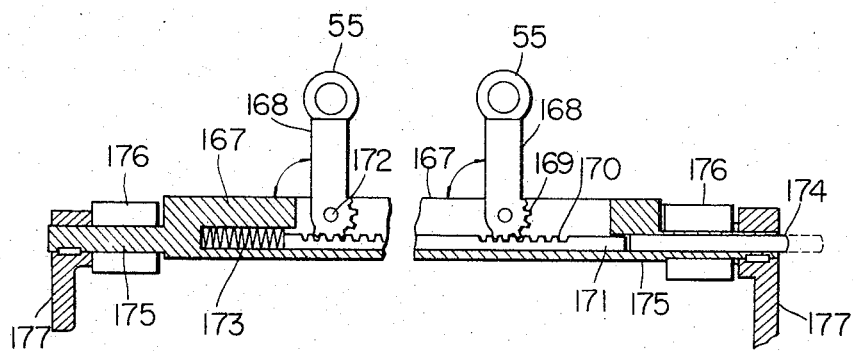
Figure 22:
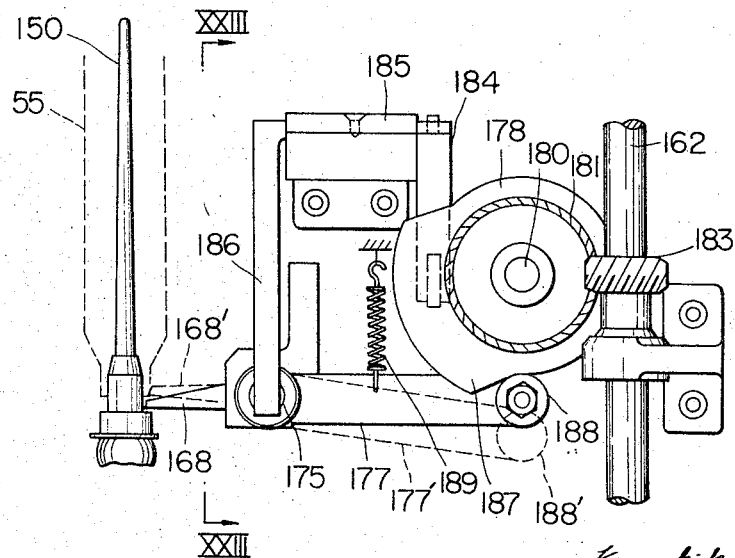
Figure 23:
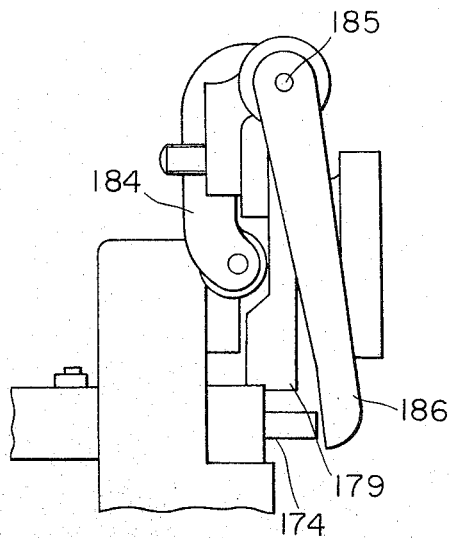
Figure 24:
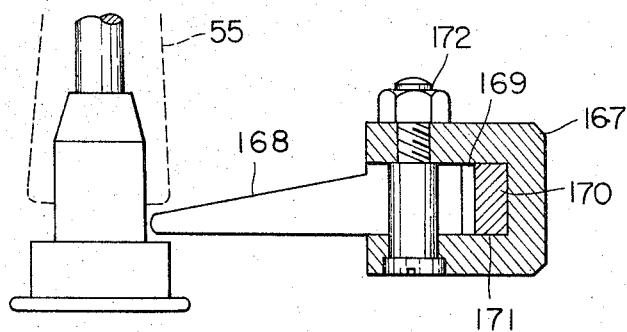
Figure 25:
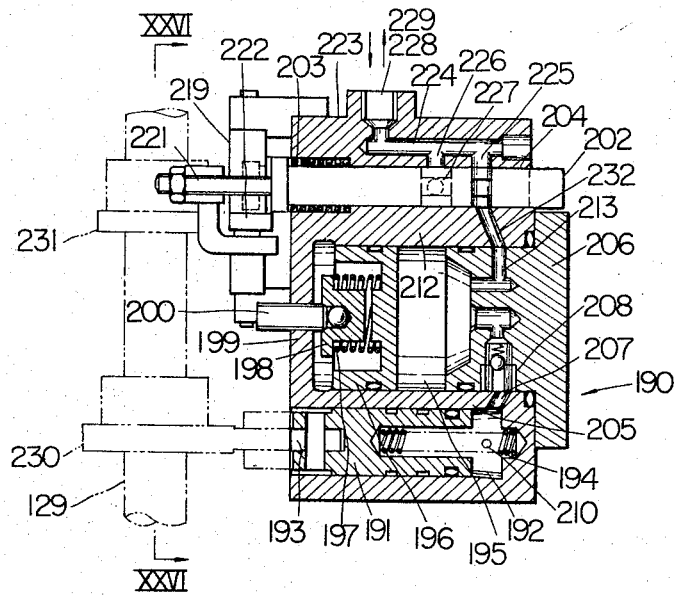
Figure 26:
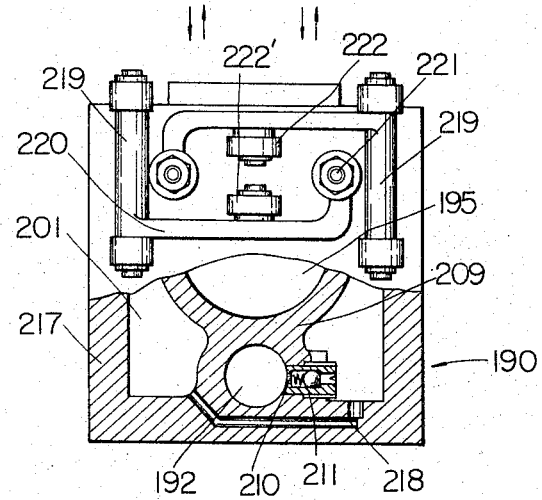
Figure 27:
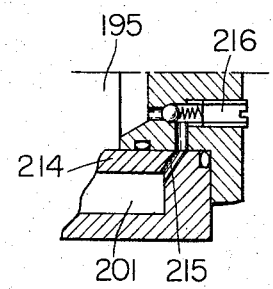
Figure 28:
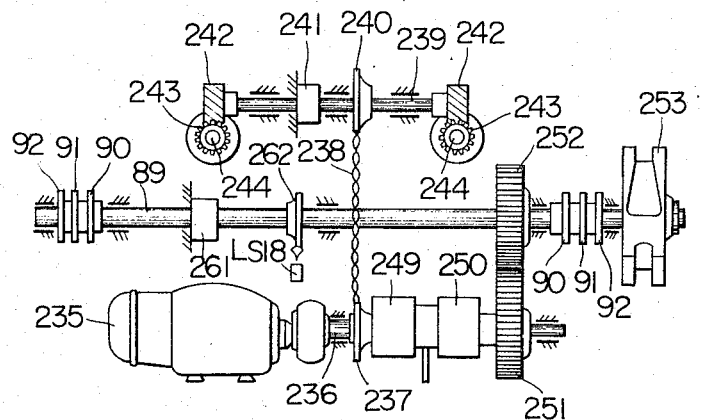
Figure 29:
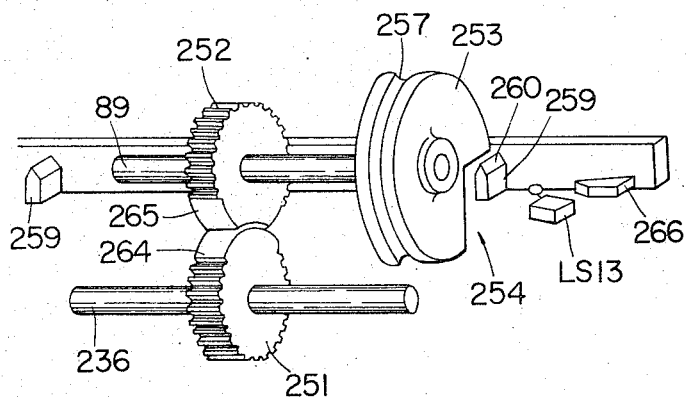
Figure 30:
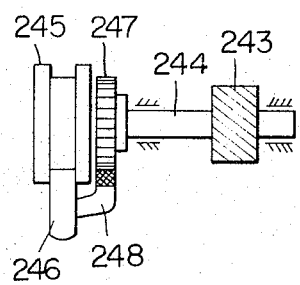
Figure 31:
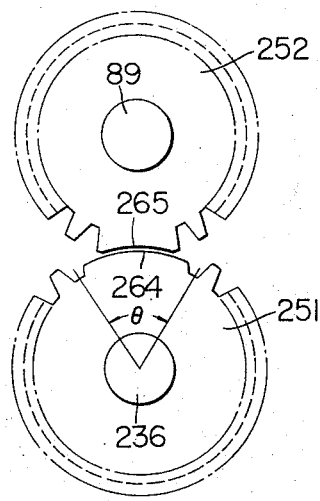
Figure 32:
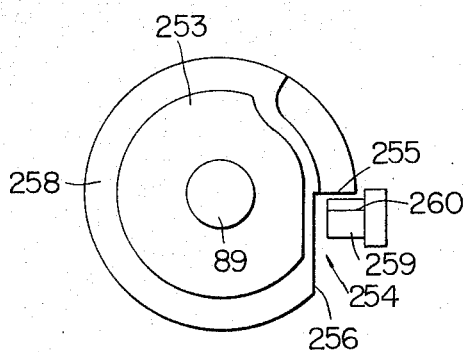
Figure 33:
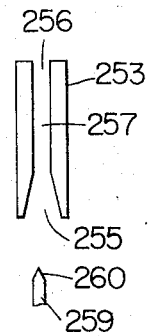
Figure 34:
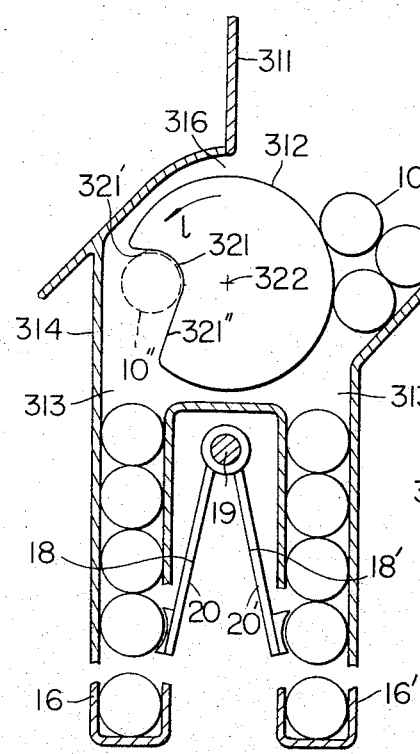
Figure 35:
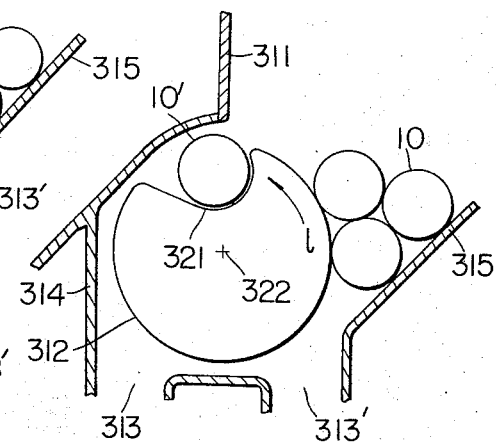
Figure 36:
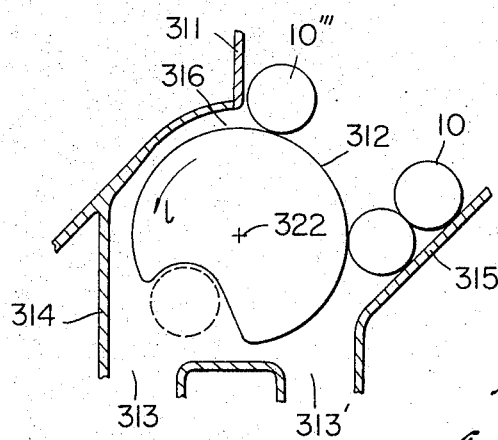
Figure 40:
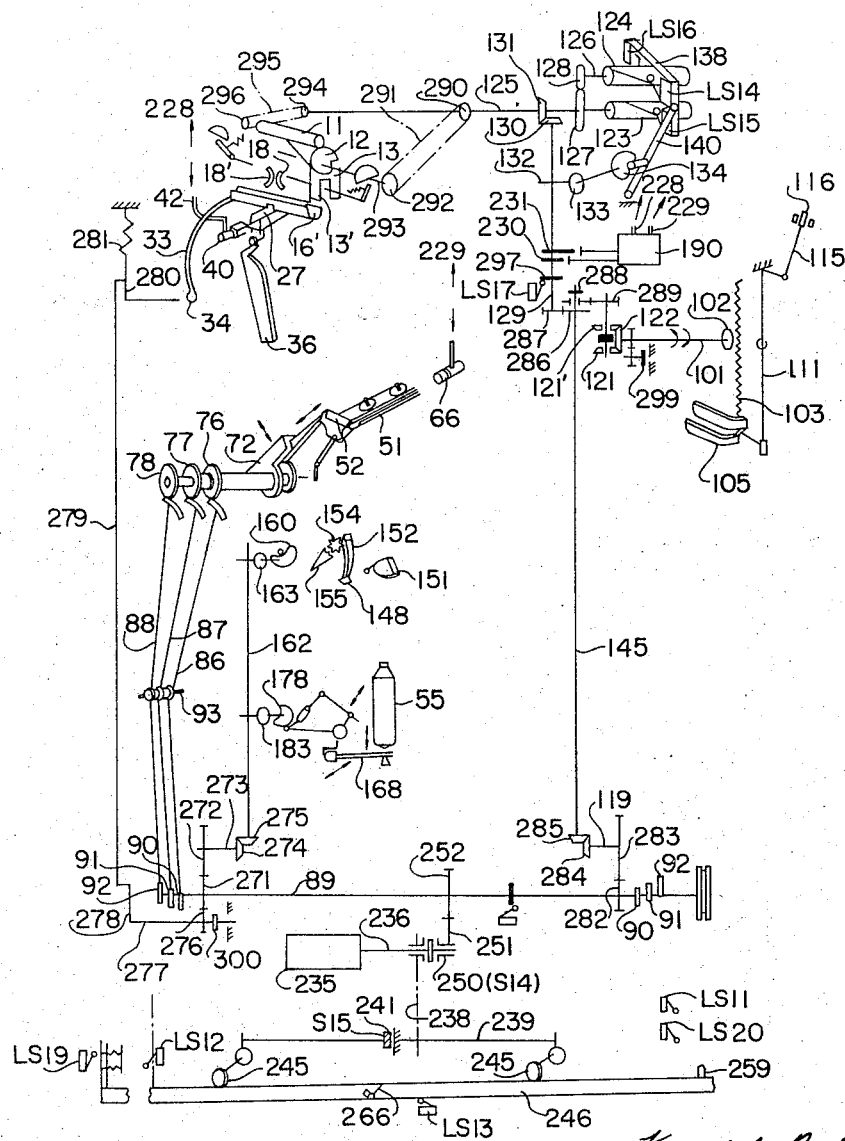
Figure 41:
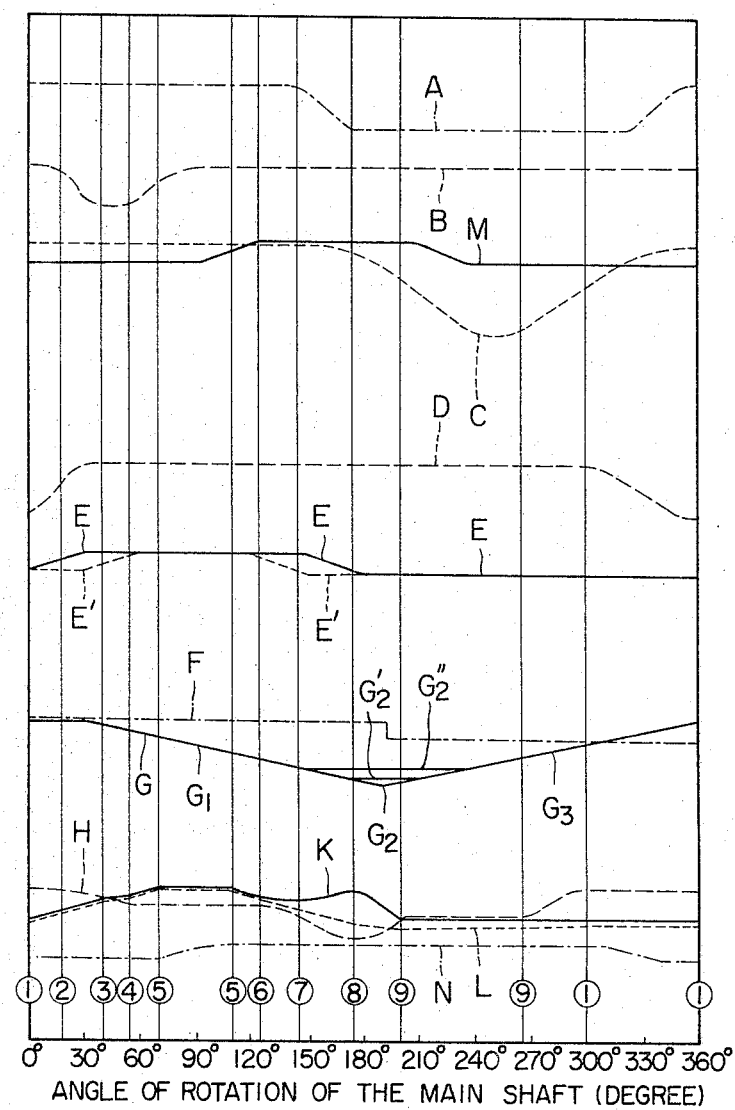
Figure 42:
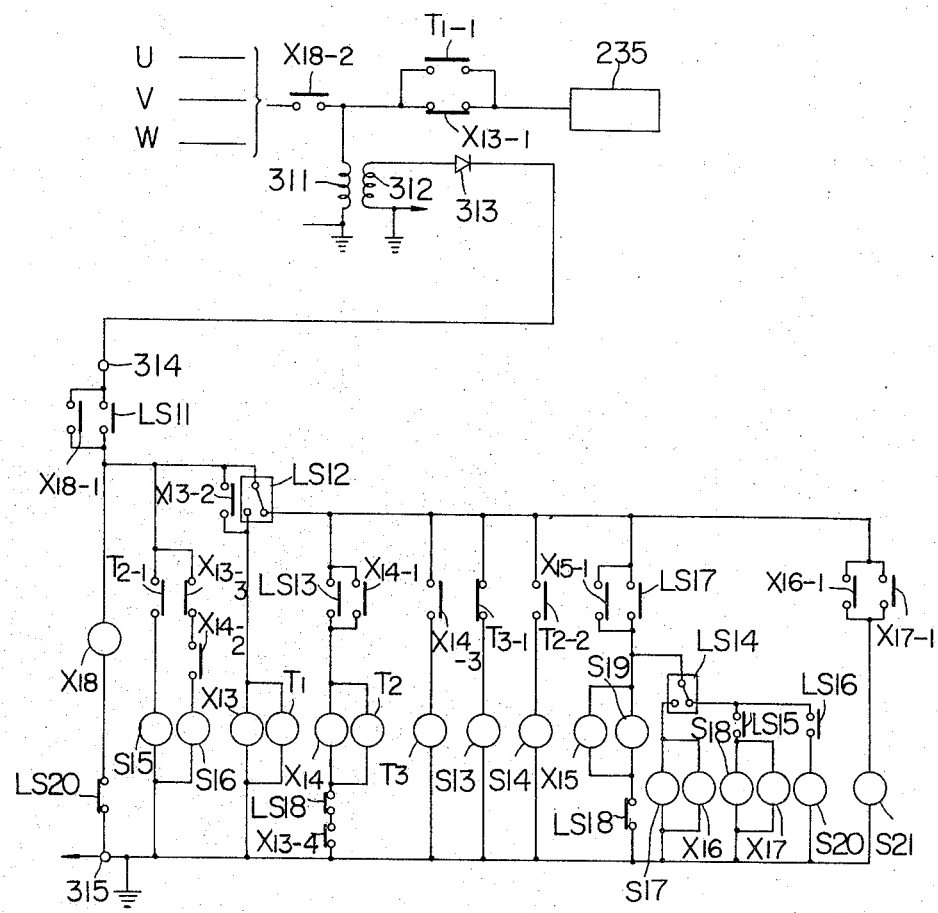

FIG. 1 is an elevation view of the invented apparatus with a part thereof broken away; FIG. 2 is in vertical section taken along line II—II of FIG. 1. FIG. 3 is a side view of an empty bobbin suplying means shown with a part thereof broken away, while FIG. 4 is a front elevation of the empty bobbin supplying means, being a sectional view taken along line IV—IV of FIG. 3 looking in the direction indicated by the arrows. FIG. 5 is a perspective view illustrating a conical roller of the empty bobbin supplying means along with the pertinent cam and levers. FIG. 6 is a cross-sectional view of the catcher of the foregoing means. FIG. 7 is a perspective view of the bobbin removing means as a whole; FIG. 8 is a side view, partly broken away, of a bobbin chucker of the bobbin removing means with the left side illustrating the state wherein a bobbin is not being held and the right side the state wherein a bobbin is being held. FIG. 9 is a bottom view of the bobbin chucking portion of FIG. 8. FIG. 10 is a side view of the rotating mechanism which transmit movements to the fitting of the bobbin removing means; FIG. 11 is a sectional view taken along line XI—XI of FIG. 10. FIG. 12 are closed curvilineal loci of the movements of the fittings; FIG. 13 shows the bobbin removing and bobbin discharging positions of the fittings in the aforesaid curvilineal loci. FIG. 14 is a perspective view of the means for raising and lowering the full wound bobbin receiver and depositing the bobbins, while FIG. 15 is an elevation view of a bobbin discharging means of the foregoing means of FIG. 14; FIG. 16 is a side view thereof. FIG. 17 illustrates the cylindrical cams used for the operation of raising and lowering of the bobbin receiver and of discharging the bobbins; FIG. 18 is a developed view of the cams of FIG. 17. FIG. 19 is a front elevation of a lappet reversing device, partly cut-away; FIG. 20 is a side view thereof. FIG. 21 is a plan view of a bobbin loosening device; FIG. 22 is a side view thereof, while FIG. 23 is another side view taken along line XXIII—XXIII of FIG. 22 looking in the direction indicated by the arrows. FIG. 24 is a side view showing the relation between the push-up lever of the bobbin loosening device and the bobbin. FIG. 25 is a vertical sectional view of a hydraulic pressure unit; FIG. 26 is a partly cutaway front elevation view thereof taken along line XXVI—XXVI of FIG. 25 looking from the direction indicated by the arrows. FIG. 27 is a sectional view of a safety valve device used for the communication of the pressurized oil storage chamber and the oil reservoir of the hydraulic pressure unit. FIG. 28 is a front elevation of the means for determining the stopping position as well as the rotating shaft position of the autodoffing apparatus. FIG. 29 is a perspective view showing the relationship between the intermittent gears and the peripheral cams, which are used in the foregoing position determining means. FIG. 30 is a side view illustrating the roller of the autodoffing apparatus, the rail over which it travels and the auxiliary rail used for braking the apparatus. FIG. 31 is a front elevation of the intermittent gears shown in FIG. 29, while FIG. 32 is a front elevation of the peripheral cam shown in FIG. 29, FIG. 33 being a developed view thereof. FIGS. 34, 35 and 36 illustrate another embodiment of the bobbin supplying means; FIG. 34 is a side view thereof while FIGS. 35 and 36 are side views of two states of its operation showing the movement of the bobbins with the conical roller. FIGS. 37, 38 and 39 illustrate a still another embodiment of the bobbin supplying means; FIG. 37 is a side sectional view thereof, FIG. 38 is a view taken along line XXXVIII—XXXVIII of FIG. 37 looking from the arrow-indicated direction, and FIG. 39 is, a perspective view of the conical roller and the related gears and mechanism thereof. FIG. 40 is a diagram for explaining the travel of the invented apparatus as well as its operation of removing and discharging the full wound bobbins and supplying of empty bobbins plus the various interconnecting actions therebetween. FIG. 41 is a program chart for carrying out the autodoffing operation. FIG. 42 is an electric circuit diagram of the autodoffing apparatus by which its travel and bobbin doffing operations are controlled.

Reverting to FIGS. 1 and 2 which schematically illustrate the invention as a whole, the part indicated by A therein is the bobbin supplying means, while B, C, D and E are a series of means for doffing the bobbins, B being the full wound bobbin removing means, C, the bobbin receiver raising and lowering and bobbin arranging means, D, the lappet reversing device and E, the bobbin loosening device. The parts indicated as F, H and J are for housing the hydraulic pressure unit and the mechanism which transmit the power for use in operating the bobbin supplying means and the full wound bobbin doffing means. That part indicated as G principally houses the driving motor for the travel of the apparatus and the mechanisms for transmitting power to the various aforementioned means. These various means should not be operated just in connection with the operation of just the aforesaid A and B means but should be operated in relationship with each other.

*Empty bobbin supplying device*

The empty bobbin supplying device which is indicated as A in FIGS. 1 and 2, as shown in FIGS. 3, 4 and 5, which show a single unit thereof, consists of an eccentric roller 11, a truncated conical roller 12 therebelow, two rows of deep channels 13, 13', a hopper formed by a vertical guide plate 14 and an inclining guide plate 15, and movable empty bobbin catchers 16, 16' disposed below the channels. Bobbin catchers 16, 16' are pivotally mounted on their underside at the end where the bobbin top comes, on a shaft 17 disposed at right angles to the axis of the bobbin and which is capable of swinging movements. Between the deep channels 13, 13' are provided bobbin holding levers 18, 18' disposed radially of tubular shafts 19, 19'. Levers 18, 18' are provided with holding pieces 20, 20' disposed at the inner sides of channels 13, 13' through spaces beneath the ends of the walls in such a manner that each faces the bobbins in its respective deep channels 13, 13'. As levers 18, 18' are adapted to be swung in the opposite directions by means of the rotation of the coaxial tubular shafts 19, 19' the bobbins 10 are held in place by being pressed against the opposing walls of deep channels 13, 13'. The foregoing truncated conical roller 12 has a groove 21 provided therein along its conical surface and is such that its axis 22 and the axis of bobbin 10 are in parallel when the bobbin is carried in said groove with the top of the bobbin in the groove at the larger-diameter end of conical roller 12 and the bottom of the bobbin at the smaller-diameter end. Further, the cross-sectiona configuration 21' of groove 21 is such that that side of the groove in the trailing position when conical roller 12 rotates in the direction of arrow *l* has a shorter radius of curvature and hence is shaped so that the bobbin can be carried upwardly when rising as it is being carried by the roller. On the other hand, the cross-sectional configuration 21" of roller 21 on that side coinciding with the rotational direction has a larger radius of curvature and is such that the bobbin descending while being carried by the roller can be readily discharged. Eccentric roller 11 rotates in the direction of arrow *m*, i.e., in the same direction as the conical roller, on a rotating shaft 23 which is eccentric of its axis. The speed of the curved surface of eccentric roller 11, i.e., its peripheral speed, is somewhat faster than that of the fastest portion of the conical roller, and the two rollers are so disposed that even when the curved surfaces thereof are at their remotest position from each other the distance between the two rollers is less than the smallest diameter of bobbin 10. At both ends of a rotating shaft 22 of conical roller 22 are secured cams 24, 24' provided respectively with notches 26, 26' which face in opposite directions. On the other hand, the tubular shafts 19, 19' on which are fitted bobbin holding levers 18, 18' are mounted longitudinally on a shaft in parallel to the shaft of conical roller 12 and are capable of rotating independently of each other. At the outer ends of the tubular shafts 19, 19' are secured levers 25, 25' pointing in a direction opposite to that of the respective levers 18, 18'. Cams 24, 24' are in engagement with levers 25, 25', respectively, and thus when conical roller 12 rotates, levers 25, 25' become engaged with the respective notches 26, 26' of the cams thereby to rotate shfats 19, 19' simultaneously in opposite directions. This rotation causes levers 18, 18' to swing momentarily in opposite directions at a prescribed period during one rotation of the conical roller, with the consequence that bobbins 10' being held by holding pieces 20, 20' are discharged into catchers 16, 16'. Catchers 16, 16' are juxtaposed on top of, say, a connecting beam of inverted U-shape whose channel entry portion is of narrower width than the channel bottom. The number of catchers provided is equal in number to the number of bobbins to be inserted at one time, i.e., ten catchers when five units of hoppers are used. In the channel of connecting beam 27, a reciprocally movable push rod 28 fitted with collars 29 is disposed axially thereof. Rollers 31 movably riding ascending and descending arms 32 are fitted at both ends of connecting beams 27 by means of roller brackets 30. Shaft 17 to which one end of catchers 16, 16' are pivotally mounted in common has at its two ends arms pivotally mounted thereon, the other ends of which arms are pivotally mounted on a rotating shaft 34. The aforementioned two ascending and descending arms 32, which are pivotally mounted on another shaft 35 close to shaft 17, swing down about shaft 35 to the position shown by dotted line 32' where they collide with guide cams 36 which are secured to frame 37.

As shown in FIG. 6, the foregoing collars 29, one of which is shown in the figure, are blocks which are secured to push rod 28 below the several catchers 16, 16'. Thus, when push rod 28 is pushed, collars 29 are moved by the blocks sliding along with the movement of the push rod inside the channel of connecting beam 27. From each of the collars 29 there projects upwardly into the catchers a bobbin holding arm 38 to the end of which is secured a holding piece 39 facing the opposite wall of the catcher. At one end of connecting beam 27 a piston cylinder 40 is provided whose piston is capable of reciprocative movements by means of the introduction of pressurized oil into the cylinder from a hereinafter described hydraulic pressure unit via entry 42. When bobbin 10 is placed in the catcher, the empty bobbin is held still in the catcher by being pressed between the side wall 43 of the catcher and the holding piece 39 of the holding arm.

When the bobbins with their bottom ends arranged at one side are inserted in the aforesaid hopper of this device, i.e., between the inclined guide plate 15 and the conical roller 12, in parallel to the rotating shaft of the roller, and then the eccentric roller 23 and the conical roller are rotated in the directions of arrows *l* and *m*, respectively, one of the bobbins drops into deep channel 13 when groove 21 of the conical roller comes opposite inclined guide plate 15 as a result of the formation of a gap between the guide plate and the groove. Then, when conical roller 12 continues its rotation, a bobbin becomes caught in groove 21, which while being carried by the conical roller comes to the vertical guide plate 14 side where it drops into deep channel 13'. The other bobbins which move along the curved surface of the conical roller at this time are thrown back by colliding with the curved surface of eccentric roller 23, since the eccentric roller rotates eccentrically about shaft 23. The bobbins which have dropped into deep channels 13, 13' fall on top of the bobbins which are held by holding pieces 20, 20' of bobbin holding levers 18, 18' disposed on that side of the deep channels below the ends of the walls.

When cams 24, 24' come into engagement with levers 25, 25', respectively, shafts 19, 19' are momentarily turned to release the hold of levers 18, 18' on the bobbins to permit the bobbins to drop into catchers 16, 16'. Previous to this, the rotating shaft 34 and shaft 35 are turned by means of another transmission means to depress ascending and descending arms 32 at the two ends of shaft 35 to the position indicated by dotted line 32' and in concomitance therewith roller 31 moves over arms 32 and then over guide cams 37 until it reaches position 31'. At this time, the connecting beam 27 to which catchers 16, 16' are affixed also tilts downwardly following roller 31 and hence the catchers are also caused to hang downwardly pivoting about shaft 17. As shaft 17 moves along line x–y, a part of a circumference described by arm 33 as the radius and with rotating shaft 34 as the center, the catchers affixed to the connecting beam 27 also moves substantially along line x–y to arrive at position 16″. At this time, the connecting beam 27, roller 31 and bobbins 10 held in the catchers arrive at respectively positions 27′, 31′ and 10′. Now, if push rod 28 is released, the bobbins are all impaled simultaneously on the hereinafter described spindles 150. Since the locus x–y that is described by shaft 17 is less than one fourth the circumference described by arm 33 with shaft 34 as the center, it does not intersect the perpendicular plane in which the row of spindles lie. As roller 31 along with the catchers follows the inclination of ascending and descending arms 32 as they tilt, the bobbins change from their horizontal position to an inclined position, and then since shaft 17 of the catchers moves by describing an arc indicated by the x–y line, the bobbins also move from their horizontal position along substantially the x–y line and the axial center of the bobbins also moves, but not beyond the perpendicular axial line of the spindle to the spinning machine side.

*Bobbin removing device*

The bobbin removing device is that part which is interposed between the A and E parts of FIG. 1. That part indicated as B in FIG. 2 is illustrated in its entirety in FIG. 7. This device has a bobbin chucking bar 51 in which are mounted sets of bobbin chucking elements 68 and 70 equal in number to the number of bobbins to be removed at one time (in this case a number equal to the number of empty bobbins to be fed at one time, say, ten sets) and it is so adapted that while causing the fittings fitted at the two ends of the chucking bar 51 to move through a prescribed locus the bobbins, while being gripped at their tops with the plurality of bobbin chucking elements, are removed from the spindles and thereafter discharged into a bobbin case.

Bobbin chucking bar 51 has a plurality of circular openings 53, for example, ten (FIGS. 8 and 9), each of which openings is provided with a guide rod 54 having a tapered tip which is of a size as will permit the entry of a full wound bobbin top 55. Above each of opening 53 is disposed an inverted L-shaped arm 57 (not shown) the hole 58 of which is provided coaxially of the opening. In each of holes 58 the guide rod 54 projects therethrough towards opening 53, which guide rod 54 has a snap ring 59 at its top end, a flange 60 at the base of its tapered portion, and between flange 60 and arm 57 a spring 61, whereby it is slidable in said hole 58 axially thereof. A sliding member 62 is provided with openings 63 at those parts opposite the several openings 53, the configuration of which opening 63 is elongated axially of the sliding member, as compared with opening 53. Sliding member 62, at its one end, is attached to chucking bar 51 by means of spring 65 fitted in a tubular portion 64 provided at one end of said chucking bar, while its other end abuts a piston communicating with a pressurized oil source 66 communicating with a hereinafter described hydraulic pressure unit. Thus the sliding member 62 is adapted to make sliding movements along guides below chucking bar 51 by being pressed towards spring 65 by means of the foregoing piston. The several sets of chucking elements 68, 70 consist of two parts made of a rubbery substance so as not to damage the bobbins when they grip the bobbins. One of them, chucking element 68, is affixed to a chucking element holder 69 which is secured to chucking bar 51, while the other, chucking element 70, is attached to sliding member 62 by way of a screw 71. Fittings 52 mounted at both ends of chucking bar 51 are attached to an actuating mechanism consisting of rack arms 79 and connecting levers 82. The make-up of this actuating mechanism is as described below (FIGS. 10 and 11).

Described with respect to one set, the foregoing actuating mechanism consists of a shaft 75 on which are idly fitted concentrically thereof an arm 72, a pinion 73 and a lever 74, each of which are capable of rotating independently from the other members, the members being supplied with power and rotated separately by means of gears 76, 77 and 78, respectively. Attached to arm 72 is rack 79 which latter is in mesh with pinion 73, which rack also serves as rack arm 79 whose distal end is pivotally attached to one part 81 of fitting 52. On the other hand, link 82 pivotally attached at part 80 of fitting 52 is at its other end pivotally attached to lever 74. As shown in FIG. 7, gears 76, 77 and 78 are in engagement with sector wheels 83, 84 and 85, respectively. The opposite ends of these sector wheels are in the form of levers 86, 87 and 88, which turn about shaft 93 independently of each other. The tips of levers 86, 87 and 88 engage respectively with cams 90, 91 and 92 secured to a common shaft 89. Thus the displacement movement resulting from the rotation of the cams in accompaniment with the rotation of shaft 89 is transmitted to gears 76, 77 and 78 via levers 86, 87 and 88 and sector wheels 83, 84 and 85. And as levers 86, 87 and 88 are adapted to rotate independently about shaft 93, the movements corresponding to the loci of the cam surfaces as described by the cams are transmitted respectively to their corresponding gears. The actuating mechanism of the counterpart is the same, and the two mechanisms are mounted in symmetry with respect to the longitudinal center of the chucking bar 51. The rotation of gear 77 turns pinion 73 about shaft 75 to cause fittings 52 to make a linearly reciprocative movement by means of rack 79, while the rotation of gear 78 rotates lever 74 about shaft 75 to cause fittings 52 to make a "head-shaking" movement by means of connecting lever 82. On the other hand, the rotation of gear 76 rotates arm 72 about shaft 75 to effect a rocking movement of fittings 52 by means of the rack and its integral arm 79. The resultant movement of these three movements is made to take place with respect to the pivotal points 80 and 81 as movements of loci 1–2–3 . . . 8–9–1 (hereinafter referred to as closed curve No. 1) and 1′–2′–3 . . . 8′–9′–1′ (hereinafter referred to as closed curve No. 2), respectively, of FIG. 12.

When removing the bobbins, the pivotal points 80 and 81 of both fittings 52 descend respectively from positions 1 and 1′ of closed curves Nos. 1 and 2 along the loci 1–2–3–4–5 and 1′–2′–3′–4′–5 with the several openings 63 of the bobbin chucking bar 51 fitting over the tops 56 of the several bobbins 55 from above. At this instant, sliding member 62, being pressed by piston 67 by the pressure from a pressurized oil source 66, the tops 56 of the bobbins are gripped by means of the chucking elements 68, 70 (FIG. 13–V). In this case, since chucking bar 51 fits below the tops 56, the tapered portion of the guide rods 54 gets inserted in the axial hole of the bobbins and springs 61 are in their compressed state (FIG. 8—left side). While in this state wherein the bobbin tops are being gripped by the chucking bar, the pivotal points 80 and 81 make respectively movements corresponding to loci 5–6–7–8–9–1 and 5′–6′–7′–8′–9′–1′, to arrive at positions 1 and 1′ where, the pressure from the pressurized oil source 66 being relaxed, not only the chucking elements 68, 70 release their hold on the tops of the bobbins but also guide rods 54 are removed from the bobbins by the reverting action of springs 61, thereby discharging the bobbins on to the hereinafter described bobbin receiving plates 105. During the time fittings 52 are making the movements on the aforesaid loci 5–6–7–8–9–1 and 5′–6′–7′–8′–9′–1′, as they are shifting to position VIII shown in FIG. 13, i.e., the pivotal points shift to positions 9, 9′ from the position at which the bobbins have been completely removed upwardly, the aforementioned empty bobbin catchers make their entry to the space corresponding to VIII, the space where the full wound bobbins had occupied on their way to being removed, and then the bobbin supplying operation is carried out.

Bobbin receiver raising and lowering device and bobbin arranging device

The bobbin receiver raising and lowering device and the bobbin arranging device are those parts of FIGS. 1 and 2 indicated by C, an overall view thereof being presented in FIG. 14 while the various constituent parts thereof are illustrated in detail in FIGS. 15, 16 and 17. As shown in FIG. 14, rotating shaft 101 has secured thereto identical pinions 102, 102' at an interval. In engagement with pinions 102, 102' are the frame racks 103, 103', respectively, and to the bottom of these racks is attached an arm 104 in parallel with rotating shaft 101. On one side of arm 104, a plurality of receiver plates 105 made up into several sets of V-shaped configuration equalling in number the number of bobbins to be removed at one time, i.e., equalling in number the number of guide rods 54, are disposed in planar fashion, with one of the long sides of each of said receiver plates hinged to hinge pins 106. Above arm 104 there is fitted so as to be reciprocally slidable a channel type slidable saddle 107. Slidable saddle 107 is provided with short arms 108 at positions corresponding to the aforesaid hinge pins 106, and said short arms are connected with short shafts 109 depending slightly offset from the hinge pins. The tips of short shafts 109 are, in turn, fitted with cams 110 which are at right angles to the shafts. Further, a shaft 111 consisting of an upper tube 112 fitted in a bearing provided in the frame of the KAD so as to be rotatable therein and a lower shaft 113 fitted in said upper tube and capable of slidable vertical movements along the inner walls of said tube is disposed in parallel with the axes of racks 103, 103'. Although shaft 113 is slidable in upper tube 112 axially thereof, the upper tube alone is rotatable with respect to the shaft center. Shaft 113 is slightly offset from the endmost hinge pin 106' of plate 105 pivotally mounted on arm 104 and has a cam 110' secured to below said plate 105 and in alignment with the aforementioned cams 110. In addition, a short arm 114 is provided which projects from slidable saddle 107, which short arm 114 along with the similarly projecting short arms 108 links together slidable saddle 107 and shaft 113. Upper tube 112 which is coupled to an electromagnet 116 by way of a linking arm 115 is adapted to be capable of reciprocative rotating movements about its axis by means of the action of said magnet through the medium of linking arm 115. When the foregoing gang of bobbin receiver plates descends, it enters a bobbin case 117 in the bottom of which are provided partitioning frames 118.

The transmission of power to the bobbin receiver raising and lowering device is carried out in the following manner. The power from main shaft 119 is transmitted through a pair of bevel gears 284, 285, a driving shaft 145, gears 286, 289 and thence to a clutch consisting of an opposing pair of bevel gears 121, 121' between which are disposed double magnetic clutches 120, 120', with which clutch engages a bevel gear 122, so that the clockwise and counterclockwise rotation of shaft 101 is made possible. As the bobbins are discharged from a bobbin receiver into the bobbin case, the level of the bobbins accumulating in the box gradually becomes higher so that the distance that the bobbins drop varies in the case the bobbins are discharged from a fixed lowered position of the bobbin receiver. Hence, to prevent damage to the bobbins, it becomes necessary that the bobbins are dropped a uniform distance at all times. For this purpose, it is required that the descending stroke of the bobbin receiver be gradually shortened. For meeting this requirement, a mechanism is provided.

The cams shown in FIGS. 14 and 17 are two cylindrical cams 123, 124 of identical configuration, which are rotatable about parallel shafts 125, 126. Cams 123, 124 are disposed in parallel and in such a manner that their development surface lie on the same side. Cam 123 is used for the descent while cam 124 is used for the ascent. Ascent cam 124 at its shaft 126 end has superposed a bandlike slanting surface whose function is discharging the bobbins, this portion being somewhat thicker than the rest of cam 124. Shafts 125 and 126 are provided with gears 127 and 128, respectively, which are in mesh with each other, thus transmitting power from gear 127 to gear 128, i.e., in the $n$ direction (FIG. 17). The power from the aforementioned shaft 145 is transmitted via gears 286, 287, shaft 129 and thence via bevel gears 130, 131 to shaft 125. In parallel with camshaft 125 are provided shafts 135, 136 in parallel, on which shafts is fitted a table 138 which makes sliding movements along said shafts and has a spring 137 for returning said table to its starting position. Further, shaft 129 has a worm 132 in mesh with a worm gear 133 whereby a shaft is rotated to rotate a cam 134 in the direction indicated by arrow $n'$. Thus, as cam 134 rotates, contact point 139 moves to swing lever 140 about its pivotal point 141 to move the foregoing sliding table 138 along shafts 135, 136 from left to right. Table 138 has a limit switch LS 14 which comes which comes in contact with the cam surface 123 and limit switches LS 15 and LS 16 which come in contact with cam surfaces 124 and 124', respectively. Thus, when the cam surfaces make contact as a result of the rotation of shafts 125, 126, the respective limit switches are closed.

The cam surfaces of the cylindrical cams, as shown by the developed view in FIG. 18, comprises a cam surface for directing the descent of the raising and lowering device of the bobbin receiver as depicted by the enclosure $aod$ corresponding to the surface of cam 123, a cam surface for directing the ascent of the raising and lowering device as depicted by enclosure $boe$ corresponding to the surface of cam 124 and a bandlike cam surface for directing the discharge of the bobbins as depicted by enclosure $boo'c$ of parallelogram shape corresponding to the surface of cam 124'. During the time the cam development surface is rotating in the $n$ direction, the sliding table 138 moves over the cam surfaces in the $p$ direction, while the three limit switches make a relative movement as if to move upwardly from the bottom of FIG. 18. Namely, first when the contact time of the switch for directing the descent of the lifting and lowering device is $r$ in the figure, the contact time of the switch for directing the ascent becomes $s$. Next, when the sliding table moves in the $p$ direction in FIG. 17, the contact time of the switch with the cam surface changes; i.e., in FIG. 18 the contact time of the switches for descent and for ascent become shorter times of $r'$ and $s'$, respectively. The shortness of the descent directing time means that the descending distance of the receiver plates is also shortened and in concomitance therewith the ascent directing time and the ascending distance are also shortened. Next, in changing from the descent to ascent, after allowing a rest time of $u$ and $u'$, respectively, LS 16 comes in contact with the surface of cam 124' during a period of time corresponding to $t$, the width of the cam for directing the discharge of the bobbins, to actuate electromagnet 116.

The full wound bobbins removed simultaneously from spindles 150 by means of the hereinbefore-mentioned bobbin removing device are discharged simultaneously between the bobbin receiver plates 105. Simultaneously, the rotative power transmitted from shaft 119 via several sets of gears and shafts rotates the cylindrical cams 123, 124. At the same time, when lever 140 moves sliding table 138 against the biasing action of spring 137, limit switch LS 14 is operated by coming into contact with cam 123 and magnetic clutch 120 causes shaft 101 to lower the receiver plates 105. When the receiver plates enter the bobbin case and reach their limit of descent, limit switch LS 14 opens to disengage clutch 120 thereby stopping receiver plates 105 at their lowered point. At this time, limit switch LS 16 is operated by coming into contact with cam 124', with the consequence that electromagnet 116 is actuated and linking arm 115 rotates shaft 111. The rotation of shaft 111 moves slidable saddle 107 by means of short arm 114, with the consequence that short arms 108 are turned in one direction to open receiver plates 105 on only one side, whereby the full wound bobbins are discharged into every other one of the partitioned frames 118 of bobbin case 117. After the bobbins have been discharged, limit switch LS 16 opens, electromagnet 116 is demagnetized, arm 115 reverts to its original position and receiver plates 105 return to their former closed state. Limit switch LS 15 is then operated by coming in contact with cam 124 to cause electromagnetic clutch 120 to reverse the rotation of shaft 101 and raise receiver plates 105 to their original position. In this case, when discharging the full wound bobbins the next time, linking arm 115 turns shaft 111 in a direction opposite to that in which it was turned before to open that side of the receiver plates 105 which did not open on the previous occasion, with the consequence that the bobbins are discharged into the partitioned frames 118 between those into which the bobbins were previously discharged.

Lappet reversing device

The lappet reversing device, which is indicated as D in FIGS. 1 and 2, as shown in detail in FIGS. 19 and 20, comprises a bar member 148 of a nonmagnetic material such as aluminum in which is provided a plurality of push-up rods with permanent magnets embedded therein, disposed in a row facing the line of lappets 151 above the spindles 150 and in a number equalling the bobbins removed at one time, for example, ten. At the two ends of bar member 148 there are provided arm members 152 facing upwardly and in such a manner as to be capable of rocking about the arm member shafts 153, 153'. On one of the arm member shafts, i.e., shaft 153 a gear 154 is mounted concentrically. Gear 154 meshes with a sector wheel 155 the latter being integral with lever 156 and which rotates about shaft 157. Provided at the distal end of lever 156 is a roller 158 which follows the peripheral edge of a cam 160 mounted on shaft 159. As cam 160 rotates in the $f$ direction, the cam and lever 156 swing to the positions indicated respectively by the dotted lines 156', 158'. Shaft 159 has a helical gear 161 secured concentrically thereto and said helical gear meshes with another helical gear 163 fitted on a shaft which rotates by means of power transmitted from driving shaft 89, as hereinafter described. Between a point 164 of lever 156 and a fixed point 166 of the KAD frame a spring 165 is provided by which the lever is biased towards fixed point 166 at all times and thus it is adapted to be returned to its original position at all times when it has been displaced.

By the rotative movement of shaft 162 cam 160 is rotated in the $f$ direction through the medium of the pair of helical gears and shaft 159. In consequence, lever 156 is turned in the $g$ direction and concomitantly sector wheel 155 turns gear 154 in the $h$ direction, with the consequence that arm member 152 shifts to the position of dotted line 152'. Since the permanent magnets embedded in push-up rods 149 push up and rotate lappets 151 to position 151' at this time, the upper part of the spindles are not topped by any obstacles. Thus the full wound bobbins can be removed from the spindles and empty bobbins impaled on the spindles from which the full wound bobbins have been removed. Then, when shaft 162 continues its rotation, roller 158 returns from position 158' to its original position, while simultaneously arm member 152 also returns from position 152' to its original position. In this case, as lever 156 is being biased by means of spring 165, its return takes place promptly as it follows the rotation of cam 160. Concomitantly therewith, lappets 151 which were held attracted to push-up rods 149 return to their original position and stop there to hold down the tops of the empty bobbins newly mounted on the spindles. As the returning force of arm members 152 is greater than the force of attraction of the magnets, push-up rods 149 separate immediately from the lappets and return to their original position.

Bobbin loosening device

The bobbin loosening device which is indicated as F in FIGS. 1 and 2 is shown in detail in FIGS. 21–24. This device comprises a bar 167 having fitted thereon push-up levers 168 in a number equal to the number of bobbins to be loosened at one time, one of which levers is pivotally attached to bar 167 with a bolt or pin 172 and forming a pinion 169 which meshes with rack 170 which makes reciprocal sliding movements within channel 171 of the bar. Push-up levers 168 rotate about pins 172 in concomitance with the reciprocal movements of rack 170 to become housed in chanel 171 or project therefrom. One end of rack 170 abuts against a spring 173 installed in bar 167 while the other end of the rack abuts a push rod 174. Hence, bar 167 makes sliding movements in channel 171 by being pushed by push rod 174 against the biasing action of spring 173. Bar 167 at its two ends is formed as shafts 175, 175 which are journaled in bearings 176, 176. Further, shafts 175, 175 each have a lever 177, as shown in FIG. 21, projecting towards in a direction opposite to the operating direction of the push-up levers 168 and adapted to rotate about shaft 175. Peripheral cam 178 and edge cam 179 are mounted on the same shaft 180, on which shaft 180 is concentrically mounted a helical gear 181 which meshes with another helical gear 183 fitted on the hereinbefore-mentioned shaft 162. An arm 184 which follows edge cam 179 is mounted on a common shaft 185 at its one end, while an arm 186 is mounted at the other end of said shaft. Thus, when edge cam 179 rotates, this is transmitted via arm 184, shaft 185 to arm 186 which then pushes push rod 174. The radius of a part 187 of the periphery of peripheral cam 178 is greater than the rest of the cam, and the periphery of the cam is followed at all times by a roller 188 at the end of lever 177. Hence, when cam 178 rotates about shaft 180, roller 188 being depressed by part 187, lever 177 is depressed about shaft 180 as indicated by the dotted line 188' shown in FIG. 22, with the consequence that lever 177 moves to position 177'. Hence, the full wound bobbins are pushed up from below by the push-up levers 168 as they shift to the position indicated by the dotted line 168' about shaft 175. Levers 177 are supported by springs 189 whose one ends are secured to the frame. Thus, when the contact between roller 188 and the 187 part of cam 178 ends, levers 177 are returned to their former state by the biasing action of springs 189.

Hydraulic pressure unit

The pressurized oil fed to port 42 of the piston cylinder connected to push rod 28 which is mounted on the bobbin holding arm 38 provided in the catchers of the bobbin supplying device and the pressurized oil fed to piston 67 of sliding member 62 mounted on bobbin chucking bar 51 are supplied by means of a hydraulic pressure unit 190 provided in the KAD. This unit is provided in the position indicated by F in FIG. 1 and it is illustrated in detail in FIGS. 25 to 27. Plunger pump 191 which is disposed in pumping chamber 192 abuts a roller 193 and is adapted to be compressed by means of said roller against the biasing action of spring 194 mounted in the plunger pump. Roller 193 abuts a cam 230 provided on the driving shaft 129, and thus by the action of cam 230 resulting from the rotation of shaft 129 roller 193 is rotated thereby effecting the reciprocal movements of plunger pump 191. Cylindrical pressurized oil storage chamber 195 is disposed above pumping chamber 192. At one end of the storage chamber 195 either a piston 196 or a bellows provided thereat is adapted to be receptive axially of the cylinder against the biasing action of spring 197 a pressure corresponding to the hydraulic pressure exerted. Spring 197 is supported at that end opposite from the piston by means of a spring retainer 198, the spring pressure being maintained at a suitable pressure by means of a spring adjusting screw 200 adjustable from the outside of casing 199.

The portion outside the pressurized oil storage chamber 195 and pumping chamber 192 on both sides of the foregoing chambers constitutes oil reservoirs 201. In that part of the casing above oil reservoirs 201 inside bores 204 are provided a pair of switching valves 202 which are capable of sliding movements against the biasing action of springs 203. Pumping chamber 192 communicates with pressurized oil storage chamber 195 by means of an opening 207 provided in piston chamber wall 205 at the compression stroke limit of the piston (right end of FIG. 25) and casing outer wall 206 via check valve 208. On the other hand, it communicates with oil reservoir 201 by means of opening 210 provided in the wall separating the two chambers via check valve 211. Pressurized oil storage chamber 195 communicates with switching valves 202 by means of passages 213 in casing outer wall 206 and openings 232 provided in common wall 212 between the storage chamber and bores 204, and communicates with oil reservoir 201 by means of opening 215 provided in the casing outer wall and oil reservoir wall 214 via safety valve 216. Further, the liquid level of the two oil reservoir chambers 201 are maintained uniform by a passage 218 which is disposed in the outer wall 217 of the casing below the oil reservoirs. The two switching valves 202 both abut at one of their ends with adjusting bolts 221 provided at the distal ends of arms 220 attached to levers 219 which are pivotally mounted on the casing by means of pins. The two arms 220 are provided at their middle part with rollers 222 and 222′, respectively, which by abutting and following cam 231 provided on driving shaft 129 are actuated to press switching valves 202 alternately by means of the action of the cam resulting from the rotation of shaft 129. Switching valves 202 are provided respectively with passages 224 and by-passes 225 which are disposed in the upper outer wall of the casing and communicate with actuating circuits 228 and 229, the former circuit communicating with cylinder port 42 of the piston of the bobbin push rod 28, while the latter circuit communicates with the hydraulic pressure source of piston 67 which is connected to the sliding member of bobbin chucking bar 51. On the other hand, the oils which have finished their functions are returned to the unit via their respective circuits and are returned to oil reservoir 201 via a hole 227 in bore 204 of switching valve 202 by means of another by-pass 226.

*Driving source*

The driving source of the KAD is installed in that part indicated by G in the bottom part of FIGS. 1 and 2, and it carries out by means of a single electric motor 235 the travel of the instant apparatus, the removing and discharging of the full wound bobbins, the supplying of empty bobbins to the spindles and the various power operations incident to the foregoing functions. The travel of the KAD along the front of a spinning machine and its stopping at prescribed positions relative to the spinning machine and the foregoing operations of removing the bobbins and supplying of empty bobbins to the spindles at the stopping positions in all cases must be carried out by stopping promptly at the precise positions and removing the full wound bobbins and supplying the empty bobbins at said positions from accurate operational datum points. Therefore, the driving shafts supplying the power for effecting the travel of the KAD and for removing and mounting the bobbins must at all times start from the same angular positions and stop at the same angular positions. The means for transmitting the power from the foregoing driving source of the KAD is as shown in FIGS. 28 to 33.

A schematic view of the overall setup is shown in FIG. 28. With respect to the travel of the KAD, the power is transmitted from motor 235 to the travel shaft 239 by means of chain 238 mounted on chain wheel 237 provided on a driving shaft 236 rotating at a suitably reduced in speed. The travel shaft has a magnetic brake 241 fitted to a part thereof and at both its ends has thereon helical gears 242 which, in turn, mesh with other helical gears 243 to drive two driven shafts 244. Grooved wheels 245 which rotatingly travel on travel rail 246 are provided at the ends of driven shafts 244 (FIG. 30). Further, knurled rollers 247 are provided coaxially of said grooved wheels 245, the knurled rollers being adapted to ride on an anti-slipping material topped auxiliary rail 248 disposed parallel to the travel rail and in the vicinity of the stopping position of wheels 245. Magnetic clutches 249, 250 for switching use are mounted on driving shaft 236, and when clutch 249 is in operation, the rotation of the driving shaft is transmitted to shaft 239, whereas when clutch 250 is in operation, the power is transmitted to the hereinafter described intermittent gear 251.

After the KAD stops its travel at about its prescribed position, the drive by which the full wound bobbins are removed while the KAD is being brought to its precise position by minute adjustments, these bobbins are discharged to the bobbin receivers and thereafter empty bobbins are accurately supplied to the spindles, is carried out during one rotation of shaft 89. Shaft 89 has mounted thereon an intermittent gear 252 which engages the foregoing intermittent gear 251. As previously mentioned, shaft 89 has sets of cams 90, 91 and 92 disposed at both sides and at one end thereof another cam 253 is provided concentrically of the shaft. As shown in FIG. 40, shaft 89 connects with shafts 145, 162 and 279 through gear mechanisms and intermediate driven shafts. Cam 253 has a part of its discoidal periphery cut away (FIG. 32) and also a uniform width groove 257 provided in its peripheral curved surface. The development view of the groove, as shown in FIG. 33, indicates that starting at the cut-away portion 255 the flared groove converges to become uniform in width throughout the other portions 258 of the periphery to end at the other side 256 of the cut-away portion. The frame of the spinning machine is fitted at prescribed intervals with boat-shaped fingers 259 the tip 260 of each of which is tapered so as to facilitate its engagement with cam 253 when the latter is rotating (FIGS. 29 and 32). Shaft 89 is also equipped with a magnetic brake 261 which is operated by a cam 262 that opens and closes a limit switch LS 18 while rotating with shaft 89. FIG. 31 illustrates the construction of the intermittent gears. Gear 251 mounted on driving shaft 236 has a convex intermittent portion 264, while gear 252 mounted on driving shaft 89 has a concave intermittent portion 265. The nmber of valleys of both gears 251 and 252 are made the same, and these gears are so designed that when shaft 236 stops after having completed one rotation, shaft 89 also has made one rotation, both gears being made to complete their rotations at the positions from which they started their rotations. In this case, if the central angle $\theta$ of the intermittent portion 264 of gear 251 used is within a range as can cover the angular irregularities of the stopping position of shaft 236, the concave intermittent portion 265 maintains at all times a constant relative engagement with convex intermittent portion 264 by means of the latter when shaft 236 stops to stop said shaft at a fixed angular position. Hence, shaft 89 stops at a fixed angular position of the shaft, with the consequence that peripheral cam 253 and the two sets of cams 90, 91 and 92 stop in such a manner that they can start rotating accurately from the same angular positions with respect to shaft 89. Further, the spinning machine frame has a plurality of dogs 266 thereon at equidistant intervals, whereby the limit switch LS 13 on the KAD by being closed by its contact with the dogs operates magnetic brake 241.

The travel of the KAD is carried out by the power from electric motor 235 being transmitted via chain wheel 237 of shaft 236 to chain wheel 240 of travel shaft 239 by means of chain 238, whereby the grooved wheels 245 are made to travel over rail 246. First, when the KAD arrives near the dogs, the knurled rollers 247 mount the auxiliary rails 248. Simultaneously, magnetic brake 241 is operated by limit switch LS 13 to stop the KAD at almost its prescribed position relative to the spinning machine frame. Then, magnetic clutch 249 is switched to magnetic clutch 250, and the rotation is transmitted to shaft 89 by means of gears 251, 252. At this time, cam 253 is stopped at a position in which its cut-away portion 254 does not contact the boat-shaped finger 260 and since the first part 255 of the cam is positioned directly above tip 260 of finger 259, as shaft 89 turns, groove 257 comes into engagement with the finger via part 255 of the cam. As finger 259 comes into engagement with the grooved part from the flared part, the KAD while being minutely adjusted as to its position along the front of the spinning frame has its position relative to the line of spindles accurately maintained. Since the intermittent gears 251, 252 stop at all times with their intermittent surfaces in engagement and transmit the rotation of shaft 236 to shaft 89 from this position, shaft 89 starts its rotation at all times from a fixed angular position. Thus, the series of actions including the removal of the full wound bobbins by means of cams 90, 91 and 92 and along with this action, the discharging of the removed bobbins into the bobbin case, the supplying of the empty bobbins, the feeding of the pressurized oil, etc. are all carried out from an accurate starting point. In addition, since cam 253 is in proper engagement with finger 259 during the rotation of shaft 89, the position of the KAD relative to the spinning frame is always maintained in its proper state. Shaft 89, after one rotation, stops accurately in the position wherein the intermittent portions of the two gears are in contact with each other. This is due to the reason that since the central angle $\theta$ of the intermittent portions is designed to be of the order such that the irregularities between the two gears can be covered, the minute movements of gear 251, as the driver, does not affect gear 252, as the follower, and thus shaft 89 stops at the angular position where it started its rotation. When shaft 89 makes one rotation, cam 262 closes limit switch LS 18, the switch for directing the travel of the KAD, with the consequence that magnetic clutch 250 is shifted to 249 and the rotation of the electric motor toward the travel side and at the same time shaft 89 is brought to a complete stop by means of magnetic brake 261.

*Modification of the bobbin supply device*

FIGS. 34 to 36 illustrate a modification of the bobbin supplying device. This is another device for supplying the bobbins to the hopper and is identical to that previously described in that it comprises a truncated conical roller 312 having a groove 321 along its side, deep channels 313, 313' between which are disposed levers 18, 18' radially of shafts 19, 19', and lever holding pieces 20, 20' by which the bobbins are restrained from falling freely into catchers 16, 16'. In this case however, instead of using an eccentric roller, a separating plate 311 is provided for preventing the bobbins, which move along the side surface of conical roller 312, from freely falling into the other side of the hopper. For accomplishing this end, the separating plate 311 is provided at the extended portion of guide plate 314, which serves as a guide at one side of the hopper, there being maintained a clearance 316 (smaller than the diameter of the bobbins) between separating plate 311 and the periphery of conical roller 312. Thus, in a construction such as this, when roller 312 rotates about its shaft 322 while carrying a bobbin, the passage of the bobbin is not impeded by the clearance 316, which is shown by 10', but when the bobbins move around the periphery of the roller in accompaniment with the rotation of the roller, the bobbin cannot pass through the clearance, as shown by bobbin 10'''. Hence, excess bobbins are not supplied to deep channel 313'. As with the previously described embodiment, in this case also the other deep channel 313 is fed its bobbins by way of the inclining plate 315.

FIGS. 37 to 39 illustrate another modification of the bobbin supplying device. In this embodiment, there are disposed below a separating plate 362 the truncated conical roller 362 and two elongated cruciform vaned wheels 375, 375' of equal vane width and having compartments RSTU and R'S'T'U', respectively, the hopper being formed by the separating plate 361, inclining guide plates 365, 365' and a vertical guide plate 364. Below each of the cruciform vaned wheels and disposed in the same plane are catchers 366, 366' positioned in such a fashion that the edges of said catchers facing each other come directly below shafts 374, 374', respectively. Conical roller 362 has grooves 371, 371' of identical configuration as previously described, which are disposed symmetrically of its central axis. Thus, when the bobbins are carried in these grooves and rotate along with conical roller 362 in the *l* direction, they do not collide with the edge 363 of separating plate 361. The configuration of both grooves 371'', 371''' is identical to that of previously described grooves 21', 21'' and 321', 321'' and is such that, when the bobbin carried in the roller rises along with it, it is readily conveyed upwardly and when descending with the roller is readily discharged. At one end of shaft 372 of conical roller 362 there is fitted a disk 376 in whose cutaway part 373 a roller 377 mounted on the end of arm 378 projects. Disk 376 taken together with an intermittent gear 379 having four round-shaped grooves 381 provided on shaft 374 of cruciform vaned wheel 375 constitute a Geneva gear device which in one rotation of disk 376 rotates the intermittent gear ¼ of a rotation. Shafts 374, 374' to which is transmitted rotation by means of meshed gears 380, 380' rotate one of the vanes of both of the cruciform vaned wheels from its horizontal position in a direction opposite to that of the other. Cruciform vaned wheels 375, 375', while carrying at all times a bobbin in one of its compartments, are made to rotate in opposite directions as indicated by arrows *m* and *n* by being rotated by means of the aforementioned Geneva gear device.

When bobbins 10, after being aligned as to their bottom ends, are inserted from the top of the hopper in this device in parallel with separating plate 361, the bobbins slidingly fall between the inclining guide plate 365 and conical roller 362 to compartment R of cruciform vane wheel 375. On the other hand, when the bobbins fill the space between cruciform vane wheel 375 and inclining guide plate 365, a bobbin also becomes borne by groove 371 of the roller. Then when conical roller 362 rotates one half of its circumference while carrying bobbin 10, it is positioned on the side of inclining guide plate 365' and vertical guide plate 364 where the bobbin slidingly falls from position 371'' into compartment R' of cruciform vaned wheel 375'. When the bobbins fill that part defined by the vertical guide plate 364 and a guide plate 368 and no further bobbins can be held there, the bobbin held in groove 371 continues to be held there to make one complete rotation with conical roller 362. The bobbin carried in groove 371 continues to be carried there until the bobbin held in the compartment of the cruciform vaned wheel 375' drops into the bobbin catcher below. The foregoing holds true for the other groove 371' also.

When disk 376 rotates in accompaniment with the rotation of conical roller 362 and as a result roller 377 makes one complete rotation in the direction of arrow *l*, roller 377 momentarily slips into groove 381 of intermittent gear 379 to rotate intermittent gear 379 fitted to shaft 374 for a quarter turn in the direction of arrow *q* and likewise the cruciform vaned wheel 375 for a quarter turn. As one of the vanes of the cruciform vaned wheels are always held stationary in a horizontal position, it prevents the bobbins which have slid down along the guide plate from falling downwards when it is in this stationary position, but when the cruciform vaned wheels rotate, the bobbins carried in compartments R, R' start moving with the rotation of the vaned wheels and when the vanes of the two wheels which were opposite one another incline such that they are at right angles to each other, the bobbins fall from between the vanes and the guide plates freely into the bobbin catchers. Thereupon, the bobbins which continue to fall along the vertical and inclining guide plates fall into the next following compartments S, S' to be held there until the cruciform vaned wheels make their next quarter turn.

Separating plate 361 has the function of preventing those bobbins other than that carried by the grooves of the conical roller from moving to that side occupied by inclining guide plate 365', vertical guide plate 364 and cruciform vaned wheel 375', tip 363 functioning to exclude all others except that carried by the groove of the conical roller.

*The organization of the power transmission machinery*

Since the KAD of this invention carries out the doffing operations by reciprocating between the frames of the spinning machines, neither its width nor its height should be very great. While the empty bobbin supplying device, bobbin removing device, bobbin receiver raising and lowering device, bobbin arranging device, lappet reversing device and bobbin loosening device, which are indicated as A, B, C, D and E in FIG. 1, occupy the central and main part of the KAD, the source for supplying hydraulic pressure to these devices and the power transmission machinery are provided clear of the main central part of the machine. A general description will be made with reference to FIG. 40.

The electric motor and the means for deciding the position at which the KAD is to stop and the angular positions of the rotating shafts, which have been fully shown in FIG. 28, are provided in the lower part G of FIG. 1. The power from part G transmitted to shaft 89 is then transmitted to shaft 273 by means of gears 271, 272 at the left end J of shaft 89. Shaft 273 transmits its rotation to shaft 162 by means of bevel gears 274, 275, which is then transmited from shaft 162 by way of helical gears 163, 161 to the lappet reversing device and by way of helical gears 183, 181 to the bobbin loosening device. On the other hand, shaft 277 is rotated by gears 271, 276, which shaft by then rotating crank 278 provided on said shaft rotates through the medium of linking arm 279 a crank 280 provided at the other end of arm 279. Crank 280, by rotating shaft 34, the crankshaft, swings arms 33 to which are attached catchers 16, 16'. Since crank 280 has connected to its one end a spring 281 which is secured to the frame of the KAD, it returns to its original position promptly and accurately.

Further, the power from shaft 89 is transmitted to shaft 119 by means of gears 282, 283 at parts F and H. Then from shaft 119 it is transmitted to shaft 129 via bevel gears 284, 285 and gears 286, 287 with an intermediate shaft 145 intervening, from whence it is transmitted by means of magnetic clutch 288 and gear 289 to bevel gears 121, 121' fitted to a double magnetic clutch 120 of the bobbin receiver raising and lowering device. Shaft 129 actuates by means of cams 230, 231 and plunger pump 191 and switching valves 202 of the hydraulic pressure unit 190, and rotates cam shaft 125 by means of bevel gears 130, 131. Shaft 125 is fitted with a chain wheel 290 in an intermediate part thereof, and by said chain wheel being connected by way of a chain 291 to chain wheel 292 provided at one end of shaft 293 fitted to the central axis of truncated conical roller 12, roller 12 is rotated. Shaft 125 has another chain wheel 294 fitted at its end. This chain wheel by being connected with chain 295 to a chain wheel fitted at the end of the shaft of eccentric roller 11 rotates the eccentric roller. Again, shaft 129 is provided with a cam 297 which actuates a limit switch LS 17 for opening and closing the circuit for the bobbin receiver raising and lowering device. Further, shaft 101 of the bobbin receiver raising and lowering device and crankshaft 277 of the empty bobbin supplying device are provided respectively with magnetic brakes 299 and 300 which take charge of the function of stopping the rotation of the respective shafts.

Along the front of the frame of the spinning machine, a single rail or a double rail is provided as previously described. One of these rails is provided at prescribed intervals with a plurality of boat-shaped fingers 259 which engage cam 253, and at the end of the rail opposite to that from the starting point of the KAD there is disposed a limit switch LS 19 which directs the return of the KAD to its starting point. The limit switches LS 12, LS 11 and LS 20 that are installed in the KAD each detect the return of the KAD to its starting point and are adapted to start operating after the KAD has returned to its starting position, by being given directions to start from this position.

*Program for motion of the assemblies of the bobbin mounting and dismounting devices*

The program of motion of the various devices during one rotation of shaft 89 is shown by means of the line diagram in FIG. 41. In this figure the abscissa represents the angle of rotation of the main shaft from 0 degrees to 360 degrees, while the ordinates represent the amount of displacement of moving members of the various devices. The moving members of the empty bobbin supplying device include the ascending and descending arms, the bobbin holding levers 18, 18' and shaft 34. These make motions corresponding to the angular displacements indicated respectively by lines A, B and C (hereinafter referred to as the lines of the first assembly). Arm 152 of the lappet reversing device makes motions corresponding to the angular displacements as depicted by line D, the push-up lever 168 of the bobbins loosening device makes displacement motions corresponding to turning and pushing up as indicated respectively by lines E and E', and arm 115 and receiver plates 105, the moving members of the full wound bobbin raising and lowering device make motions corresponding to the displacements indicated respectively by lines F and G. (The foregoing to be hereinafter referred to as lines of second assembly.) The moving members of the bobbin removing device are the fittings 52 which perform a motion which is a resultant of the motions of lever 74, pinion 73 and arm 72; the lever, pinion and arm making motions corresponding to the displacements described respectively by lines H, K and L (hereinafter referred to as lines of third assembly) to cause the pivotal points 80, 81 of the supporting member to make motions in accordance with closed curves Nos. 1 and 2, respectively.

On the other hand, the hydraulic pressure to the piston for actuating the bobbin holding arms 38 of the empty bobbin supplying device and the piston for moving the chucking elements of the bobbin chucking bar is supplied by slidingly moving a pair of switching valves by means of cam 231. Hence, the supplying of pressurized oil to the empty bobbin supplying device and the bobbin removing device is carried out by motions the amounts of which correspond to the displacements indicated by means of lines M and N, respectively.

The transmission of power from the main shaft 89 to the empty bobbin supplying device involves the rotation of eccentric roller 11 and truncated conical roller 12, the opening and closing of bobbin holding levers 18, 18' by means of the rotation of shafts 19, 19', the shift in the angle of inclination of descending and ascending arms 32, and the shift of arm 33 and in concomitance therewith the catchers along substantially the x–y line as a result of the rotation of crankshaft 34. The eccentric roller and truncated conical roller make one rotation during one rotation of the main shaft, and during this time the empty bobbins 10 are supplied to the deep channels 13, 13'. In this case, even though the angular starting points of the rollers differ to cause discrepancies timewise in supplying of the bobbins to the deep channels, this alone does not affect the other operations very much. However, the operation in which bobbin holding levers 18, 18' open and feed the bobbins to catchers 16, 16' must be done before the catchers are inclined, while the inclination of the catchers towards the spindles by rotating crankshaft 34 must be done after the full wound bobbins 55 have been removed from the spindles and the full wound bobbins that have been removed must be out of the way of the supply route before the catchers arrive there. Thus, in order to meet these requirements, the ascending and decending arm makes a motion corresponding to the displacements indicated by line A, levers 25, 25' which control the rotation of shafts 19, 19' which turn levers 18, 18' make a motion corresponding to the angular displacements indicated by line B, and the descent of the catchers makes a motion corresponding to the displacements described by line C.

First of all, since the empty bobbins have already been supplied to the spindles on the previous round and the catchers 16, 16' being without a supply of empty bobbins, bobbins are supplied to the catchers in the initial stages of the rotation of the main shaft. Soon after the rotation of the main shaft starts, levers 25, 25' become engaged with notches 26, 26' of cam 24, 24' fitted at the two ends of the truncated conical roller whereby a motion corresponding to the displacement described in line B is transmitted to bobbin holding levers 18, 18' to open the levers and supply both catchers 16 and 16' each with a bobbin. The foregoing displacement is completed during the interval up to about 100 degrees of the rotative angle of the main shaft, after which the levers 18, 18' return to their initial angular position to hold the next bobbins. Along with the foregoing motion, the hydraulic pressure unit 190, as indicated by line M, actuates piston 41 at between about 95–125 degrees of the rotative angle of the main shaft to hold by means of bobbin holding arms 38 and holding pieces 39 the bobbins fed to the catchers. Then, at about 140 to 175 degrees of the rotative angle of the main shaft, ascending and descending arm 32 descends in accordance with the displacement described by line A and maintains its position at its lowered point. Concurrently, shaft 34 starts rotating by making a displacement motion from the vicinity of a rotative angle of 140 degrees of the main shaft, as indicated by line C, and roller 31 rolls down the inclined ascending and descending arm 32' while arm 33 tilts to the left side of FIG. 3 to tilt the catchers to position 16'' substantially along the x–y line. During the rotative angle of 210–240 degrees of the main shaft, the interval during which the catchers are descending, hydraulic pressure unit 190, as indicated by line M, actuates piston 41 to relax its pressure on bobbin holding arms 38, with the consequence that the bobbins 10 are released from the catchers and are mounted on the spindles during the interval up to a rotative angle of 250 degrees of the main shaft, the bottommost point of descent of the catchers. Thereafter, arm 33 takes a course the reverse of that described above to return to its original position, and thus one complete rotation of the main shaft is finished. Further, the ascending and descending arm 32 by picking up roller 31 at between about 325 to 360 degrees of the rotative angle of the main shaft returns to its former position.

The bobbin removing device effects the motions along the corresponding points such as 1, 1' and 2, 2' of the respective closed curves Nos. 1 and 2 mentioned hereinbefore. In the line diagrams of the lines of the third assembly which represent the motions carried out with respect to the rotative angle of the main shaft during its one complete rotation by lever 74, pinion 73 and arm 72 for the composition of the foregoing motions of the bobbin removing device, the supporting member 52 descends from position I (corresponding to 1, 1') to position V (corresponding to 5, 5'), the bottommost point, at a rotative angle of about 70 degrees of the main shaft. At this point, bobbin chucking bar 51 is fitted over bobbin tops 56 and stops at the bottommost point until a rotative angle of about 110 degrees of the main shaft is reached. In the meanwhile, cam 231 of the hydraulic pressure unit 190 opens the switching valve and, as indicated by line N, actuates the unit at the abscissa between about 70 to 100 degrees whereby piston 67 is pressed to move sliding member 62 and chucking elements 70 and grip the bobbin tops. The bobbins are then removed from spindles 150 substantially upwardly, after which during the interval up to a rotative angle of about 175 degrees of the main shaft the bobbins are moved above spindles from position VI (corresponding to 6, 6') to position VII (corresponding to 7, 7') and thence to position VIII (corresponding to 8, 8') followed by being moved to a horizontal position at about 175 to 200 degrees between position VIII and position IX (corresponding to 9, 9'), thereby opening the route for supplying the empty bobbins. Supporting members 52, after stopping at position IX, the interval between about 200 and 265 degrees of the rotative angle of the main shaft, moves during the interval up to 300 degrees of the rotative angle of the main shaft to the initial position I as result of the levers 74 making a great turn, the full wound bobbins being then discharged to the bobbin receiver plates 105 in this state at between a rotative angle of 310 to 340 degrees of the main shaft. Although shaft 34 already starts its rotation during this operation during the time supporting member 52 is moving from position VIII to IX, its rotation being still slight, the passage of the catchers which move from position VIII to VI following the movement of the supporting member is not hindered. Further, since the release and dropping of the empty bobbins to the spindles is effected at a rotative angle of about 210 to 240 of the main shaft and by this time the supporting members 52 have already shifted to position IX, the mounting of the empty bobbins to the spindles is not hindered.

The full wound bobbin raising and lowering device ascends and descends while making the motions corresponding to the displacement indicated by line G of the lines of the second assembly, while the actions of linking arm 115 comprises motions corresponding to the displacements indicated by line F by which it opens and closes the bobbin receivers 105 at the latters' point of descent to discharge the bobbins. Since the bobbin receiver plates 105 having risen on their previous round have been discharged thereon with full wound bobbins 55 at a point near to its extremity of ascent, i.e., at a rotative angle of about 310–340 degrees of the main shaft, first, at a rotative angle of about 25 degrees of the main shaft, cylindrical cam 123 and limit switch LS 14 come in contact to operate magnetic clutch 120, with the consequence that the driving shaft rotates shaft 101 in the direction in which the receiver plates descend and thus effect the descent of the receiver plates. At a rotative angle of 192 degrees of the main shaft limit switch LS 14 becomes disengaged from cam 123, then limit switch LS 16 contacts cylindrical cam 124 to operate electromagnet 116, with the consequence that by a series of actions originating from linking arm 115 the bobbin receiver plates are opened, the bobbins carried by the receiver plates are released to bobbin case 117, the receiver plates are closed and thereafter by cam 124 and limit switch LS 15 coming into contact the magnetic clutch is made to reverse the rotation of shaft 101 to raise the receiver plates, and with the completion of one rotation of the main shaft the ascent of the receiver plates ends. At this time, at a point near the top of the ascent of the receiver plates the bobbins doffed during this round are discharged on to the receiver plates. The receiver plates perform a motion corresponding to the displacements along line $G_1$, bottom point $G_2$ and line $G_3$.

When the doffed wound bobbins which are discharged into the bobbin case accumulate therein, the contact time of cam 123 and limit switch LS 14 gradually becomes shorter and at the same time the contact time of cam 124 and limit switch 15 is also shortened, with the consequence that the receiver plates do not descend to the bottommost point of their descent but stop at an intermediate point where they discharge the bobbins and rise from this point, the ascending stroke from this point being a motion corresponding to the displacements along lines G, $G_2'$, $G_3$ and subsequently lines $G_1$, $G_2''$, $G_3$. Namely, the portions indicated as $G_1$ and $G_3$ are descending and ascending motons, respectively, while the portions indicated as $G_2'$ and $G_2''$ represent the stopped state after the descent. Then the electromagnet 116 becoming operative by always being energized at the rotative angle of about 192 degrees of the main shaft opens and closes the receiver plates. Although the energization is continued in this case until one rotation of the main shaft is completed, the mechanism is so designed that the opening and closing of the receiver plates do not occur again.

The lappet reversing device moves simultaneously as shaft 89 starts to rotate as indicated by line D, and it completes the reversing of the lappets at the rotative angle of about 30 degrees of the shaft. Namely, as a result of the rotation of cam 160, roller 158 which was held in the cutaway portion of the periphery of the cam leaves this cutaway portion and moves to position 158′, thus swinging arm 152 to position 152′. While the passage for the bobbin has been opened up by the maintenance of this state, the wound bobbin is removed from the spindle and supplied with an empty bobbin, and then after shaft 89 has rotated to about 300 degrees, the foregoing roller 158 again becomes engaged with the cut-away portion of the periphery of cam 160 and arm 152 reverts from position 152′ to its original position 152.

The bobbin loosening device operates almost simultaneously with the lappet reversing device. As indicated by line E, during the interval up to a rotative angle of about 30 degrees of the main shaft push rod 174 fitted with a rack is pushed by means of edge cam 179 through the medium of arm 184, common shaft 185 and arm 186, with the consequence that push-up levers 168 are swung to below bobbin 55 by means of pinion 169, in which position the push-up levers are held. Then, as indicated by line E′, from about the vicinity of 30 degrees the protuberant portion 187 of peripheral cam 178 pushes roller 188 to position 188′, thus depressing lever 177 thereby to push up bobbins 55 up to the pushed-up position 168′ of push-up levers 168 to maintain this state until bobbin chucking bar 51, at about a rotative angle of 70 to 110 degrees of the main shaft, grips the bobbins and starts removing the full wound bobbins at about 110 degrees. After this, push-up levers 168 are retracted and swung back to their original position during the interval up to a rotative angle of 180 degrees of the main shaft, i.e., before catchers 16 start their precipitous inclination for mounting the empty bobbins.

Thus, if the action of the hereinbefore described several devices during one rotation of the main shaft are recapitulated, they are as follows: First, the lappets are reversed to open the way for the exchange of bobbins, the bobbin loosening device is moved to below the bobbins and the bobbins are loosened from their spindles and the bobbin chucking bar is moved to its bobbin chucking point. In the meantime, the bobbin holders of the hopper are relaxed and empty bobbins are fed to the catchers, and at the same time, the bobbin receiver plates, while holding the bobbins discharged during the previous round, start to descend. Then the bobbin chucking bar which has received the bobbins into its plurality of openings, grips the bobbins by means of the action of the hydraulic pressure unit, removes the bobbins from their spindles and starts to rise. In the meanwhile, the empty bobbins which have been supplied to the catchers are held therein with certainty by the action of the hydraulic pressure unit. During the course of the ascent of the bobbin chucking bar, arm 33 of the empty bobbin supplying device starts to incline, while in the meantime the bobbin loosening device returns to its starting point. Then, while the bobbin chucking bar is shifting laterally (position IX of FIG. 12) from its position directly above the spindles, the bobbin receiver plates reach their bottom point of descent, discharge their bobbins and start to rise. During the time the bobbin chucking bar is at position IX, the catchers tilt downwardly and by the subsequent release of the pressure of the hydraulic pressure unit supply the empty bobbins to the spindles, after which they start to return to their original position along with arm 33. Thereafter the bobbin chucking bar returns to its original position and discharges bobbins to the bobbin receiver plates which are at about their top point of ascent. Thus one rotation of the main shaft is completed with the raising and lowering device, the lappet reversing device and bobbin supplying device having returned to their former positions.

Electrical control circuits

An example of a wiring diagram for driving and operating the KAD is shown in FIG. 42. The power to the KAD is supplied from a three-phase power source, the power source of the spinning machines, directly to the motor for the travel of the KAD and the rectification apparatus via a normally open three-phase contact $X_{18-2}$. In two of the phases of the three phase to motor 235 there are provided in parallel for switching the direction of rotation of the motor two normally closed contacts $X_{13-1}$ and two normally open contacts $T_{1-1}$. By taking power from between contact points $X_{18-2}$ and $X_{13-1}$ directly to a step-down transformer 306 and a rectifier 308, the alternating current is rectified to direct current which is then connected with terminal 309 of the operatings circuits. The foregoing rectifier, operations circuit and relays for operation are provided either in the carriage (not shown) of the KAD or a suitable place at the starting point of the KAD. The operations circuit is made up in the following manner.

A normally open limit switch LS 11 for directing the start of the KAD and in parallel therewith and a normally open contact $X_{18-1}$ of the electric source for KAD operations are connected in series with a relay $X_{18}$ of the KAD operations electric source and a normally closed limit switch LS 20 which opens by being directed when the KAD returns to either the carriage or starting point, the circuit then being connected to second terminal 310. In this case, as a matter of convenience, the second terminal is grounded at the same potential as that of one of the terminals of the secondary side of the transformer. In parallel with the series circuit of relay $X_{18}$ and limit switch LS 20 are provided three series circuits: Namely, a series circuit consisting of a normally open contact $T_{2-1}$ and a solenoid S 15 for magnetic brake 241 for use in connection with the travel of the KAD; a series circuit consisting of a normally closed contact $X_{13-3}$, a normally open contact $X_{14-2}$ and a solenoid S 16 of a magnetic brake for the bobbin doffing operation; and a series circuit consisting of two parallel circuits connected in series, one being a normally open contact $X_{13-2}$ in parallel with the normally open side of a limit switch LS 12 for detecting the return of the KAD, and the other being a relay $X_{13}$ for the return operation of the KAD in parallel with a time relay $T_1$ for operating the motor in reverse. Further, the following six circuits are in parallel between limit switch LS 12 and the second terminal 310; namely:

(i) A series circuit consisting of a limit switch LS 13 for detecting the bobbin doffing position of the KAD, a relay $X_{14}$ for signaling the stopping of the KAD, a normally closed limit switch LS 18 for detecting the completion of the bobbin doffing and for directing the travel of the KAD and a normally closed contact $X_{13-4}$. Further, in parallel with limit switch LS 13 and relay $X_{14}$ are provided respectively a normally open contact $X_{14-1}$ and a time relay $T_2$ for opening and closing solenoids S 14 and S 15.

(ii) A series circuit of a normally open contact $X_{14-3}$ and a time relay $T_3$ for switching solenoid S 13 of the magnetic clutch 249.

(iii) A series circuit of a normally closed contact $T_{3-1}$ and solenoid S 13.

(iv) A series circuit of a normally open contact $T_{2-2}$ and solenoid S 14 of the magnetic clutch 250.

(v) A circuit consisting of a parallel circuit of normally open contacts $X_{16-1}$ and $X_{17}$, which are in series with a solenoid S 21 for the brake which determines the position of the raising and lowering device.

(vi) A series circuit consisting of a normally open limit switch LS 17 for the raising and lowering device, a solenoid S 19 for the magnetic clutch 288 and a limit switch LS 18 for use in directing the travel of the KAD, a normally open contact $X_{15-1}$ and a relay $X_{15}$ for operating the raising and lowering device being placed in parallel with respectively the limit switch LS 17 and the solenoid S 19.

Further, disposed in parallel with the series circuit of the solenoid S 19 and the limit switch LS 18 are the following circuits:

(a) A circuit in which are provided on the normally open side of a limit switch LS 14 for directing the descent of the raising and lowering device, in parallel therewith, a solenoid S 17 used for switching magnetic clutch 120 to the descent side and a relay $X_{16}$ for lowering the raising and lowering device.

(b) A circuit in which a normally open limit switch LS 15 for directing the ascent of the raising and lowering device is placed in series with a parallel circuit consisting of a solenoid S 18 used for switching magnetic clutch 120 to the ascent side and a relay $X_{17}$ for raising the raising and lowering device.

(c) A series circuit of a solenoid S 20 of a magnet for operating the discharge of the bobbins and a normally open limit switch for directing the discharge of the bobbins.

*Operation*

In the hereinabove described wiring, when limit switch 11 is closed by means of a direction from the carriage or the starting point of the KAD, relay $X_{18}$ is operated and contacts $X_{18-1}$, $X_{18-2}$ are closed. Motor 235 is made to rotate in its regular direction by means of contact $X_{18-2}$, i.e., so that the KAD travels along the front of the spinning machine from its starting point. On the other hand, the circuit of relay $X_{18}$ becomes self held by means of contact $X_{18-1}$. In this case, since electricity is passed through the circuit of solenoid S 13, clutch 249 is placed in engagement, with the consequence that motor 235 rotates travel shaft 239 to effect the travel of the KAD along the front of the spinning machine. When limit switch LS 13 of the KAD contacts the first dog 266 during its travel, this closes limit switch LS 13 to operate relay $X_{14}$ and time relay $T_2$. Contacts $X_{14-1}$, $X_{14-2}$ and $X_{14-3}$ are closed by relay $X_{14}$, and as a result of contact $X_{14-1}$ being closed, the circuit of relay $X_{14}$ becomes self held. On the other hand, time relay $T_3$ is operated by contact $X_{14-3}$ to open contact $T_{3-1}$, with the consequence that solenoid S 13 is opened and clutch 249 is thereby disengaged. Further, when contact $X_{14-2}$ is closed, solenoid S 16 operates to release the braking action of magnetic brake 300 which functions to prevent the oscillation of shaft 89 during the travel of the KAD.

When the foregoing time relay $T_2$ operates, contacts $T_{2-1}$, $T_{2-2}$ close. Hence, solenoid S 15 is operated by contact $T_{2-1}$ to cause magnetic brake 214 of travel shaft 239 to be operated to stop shaft 239, while solenoid S 14 is operated by means of contact $T_{2-2}$ to operate magnetic clutch 250, whereby the power of motor 235 is transmitted to shaft 89. Thus, cam 235 at the end of shaft 89 rotates and engages with boat-shaped finger 259, with the consequence that the KAD, while being minutely adjusted as to its position, is stopped in an accurate position relative to the spinning machine. In the meanwhile, the power from the rotation of shaft 89 rotates shaft 162 via shaft 273 and bevel gears 274, 275. Then the lappets are reversed through the medium of helical gear 163 while effecting the displacements in accordance with line D of FIG. 41, while the bobbins are loosened from the spindles through the medium of helical gear 183 by effecting the displacements according to lines E, E'. The bobbins are then removed from the spindles by means of the bobbin removing device through the medium of cams 90, 91 and 92, in accordance with the displacements shown in the lines of the third assembly and closed curves Nos. 1 and 2, and thereafter discharged to the bobbin receiver plates 105. Further, the rotation of shaft 89 is transmitted via shaft 119, bevel gears 284, 285, then shaft 145 and bevel gears 286, 287 to shaft 129. When cam 279 closes limit switch LS 17, relay $X_{15}$ and solenoid S 19 are operated, whereby contact $X_{15-1}$ is closed by relay $X_{15}$ and the circuit including relay $X_{15}$ becomes self held, while the operation of solenoid S 19 causes magnetic clutch 288 to transmit the driving power of shaft 129 to the side of the double magnetic clutch 120. The rotation of shaft 129 rotates cylindrical cams 123, 124 by means of bevel gears 130, 131 and at the same time effects the sliding movements of sliding table 138 by means of worm 132 and worm gear 133, with the consequence that cylindrical cam 123 throws limit switch LS 14 to the opposite side, i.e., the left side of FIG. 42, and operates solenoid S 17 and relay $X_{16}$. Solenoid S 17 causes double clutch 120 to operate the raising and lowering device in the descending direction, shaft 101 being rotated in the descending direction by the engagement of bevel gears 121', 122, thus lowering the bobbin plates 105, loaded with bobbins, towards bobbin case 117 (line $G_1$ of the lines of the second assembly). Since contact $X_{16-1}$ is closed at this time, solenoid S 21 is operated at the bottom point of the descent and the rotation of shaft 101 is stopped by means of magnetic brake 299. At this time, cylindrical cam 124' closes limit switch LS 16 to operate solenoid S 20 which, in turn, operates magnet 116 whereby the receiver plates 105 are opened by link 115 and shaft 111, and the bobbins 55 are discharged into case 117 (line $G_2$ of the lines of the second assembly). Thereafter cylindrical cam 124 contacts limit switch LS 15 and closes it thereby operating solenoid S 18 which causes bevel gears 121, 122 of double clutch 120 to become engaged to rotate shaft 101 in the ascending direction, thus raising the receiver plates 105 (line $G_3$ of the lines of the second assembly). When limit switch LS 17 closes, relay $X_{17}$ closes contact $X_{17-1}$ and the rotation of shaft 101 is stopped by magnetic brake 299 at the elevated position of the raising and lowering device. During the descent and ascent of the foregoing raising and lowering device, shaft 125 rotates conical roller 12 by means of chain wheel 290, chain 291 and chain wheel 292; and eccentric roller 11 by means of chain wheel 294, chain 295 and chain wheel 296, whereby empty bobbins 10 are supplied from the hopper to catchers 16, 16' (line B of the lines of the first assembly). Furthermore, shaft 89 rotates crank 280 via gears 271, 276, shaft 277, crank 287 and connecting rod 279, whereby the rotating shaft 34 of arm 33 is rotated and the empty bobbins are supplied to the spindles (lines A and C of the lines of the first assembly). In concomitance with the foregoing operations, by means of cams 230, 231 operated by shaft 129 pressurized oil is supplied alternately from hydraulic pressure unit 190 to cylinder 40 having a push rod of a connecting beam 27 fitted with holding pieces of catchers 16 and to pressurized oil source 66 of the piston of bobbin chucking bar 51 (lines M and N).

When the removal of the full wound bobbins from spindles 150, the insertion thereto of empty bobbins and other operations related to the foregoing actions are completed, cam 262 contacts limit switch LS 18 and opens it, then, since the relay $X_{15}$ circuit opens, magnetic clutch 288 is disengaged by means of solenoid S 19 and the transmission of power to the raising and lowering device ceases. On the other hand, limit switch LS 18 opens relay $X_{14}$ and time relay $T_2$, and contact $X_{14-2}$ energizes solenoid S 16 to operate brake 300 and immobilizes shaft 89. Contact $T_{2-2}$ is opened by time relay $T_2$ and magnetic clutch 250 becomes disengaged by means of solenoid S 14. When contact $X_{14-3}$ opens and time relay $T_3$ becomes inoperative, contact $T_{3-1}$ closes and magnetic clutch 249 becomes engaged, then the travel shaft of the KAD starts to rotate and the KAD travels to the next dog, after which it stops and repeats the same operation as in the previous round.

Thus the KAD by repeating its shifting and stopping actions along the front of the spinning machine completes the exchanging of all the full wound bobbins of the spindles for empty bobbins, after which it travels further along the same direction until limit switch LS 12 provided at the end of the KAD collides with the end of the spinning machine, whereupon limit switch LS 12 at the top of FIG. 40 is thrown to the left side. At this instant, limit switch LS 19 provided at the end of the spinning machine (FIG. 40) closes and the KAD is directed to return to its starting point. When limit switch LS 12 is closed to the opposite side, relay $X_{13}$ and time relay $T_1$ close, and contact $X_{13-2}$ closes to render relay $X_{13}$ self held: Simultaneously, by contact $T_{1-1}$ closing and contact $X_{13-1}$ opening, motor 235 is rotated in reverse and the KAD starts traveling in its return direction. Since contact $X_{13-3}$ and $X_{13-4}$ are closed at this time, electric current does not flow in the operations circuit by which the bobbin exchanging operations are carried out by the relays $X_{14}$ and $T_2$. In addition, as solenoid S 16 is open, brake 300 of shaft 89 does not become actuated. Thus, when the KAD returns to its carriage or the starting point from which it originally started, limit switch LS 20 closes to deenergize relay $X_{18}$ and opens contact $X_{18-2}$, thus cutting off the source of power.

*Summary*

The autodoffing apparatus and method of the present invention has a great number of features as described herein. According to the invention, the KAD, while being caused to travel between the rows of spinning machines over a rail provided along the front of the spinning machines, is stopped at prescribed intervals where, after switching the power for travel to that for operating the bobbin exchanging means it exchanges a plurality of bobbins, after which it resumes its travel in the same direction for a prescribed distance from the previous position at which it performs bobbin exchanging to effect in like manner the exchanging of a plurality of bobbins, and thus to continue repeating this operation in like manner until it reaches the end of the spinning machine.

The invented apparatus carries out these operations in a very limited and confined space accurately and automatically in accordance with a prescribed program, returning promptly to its former position after having accomplished the exchanging operations. For accomplishing these operations, a plurality of empty bobbins are guided from their horizontal position along substantially the line x–y to be mounted on the spindles, full wound bobbins are removed from their spindles and discharged by means of motions described by two prescribed closed curves, the lappets are reversed and the full wound bobbins are loosened from their spindles prior to the removal of the bobbins, and then the full wound bobbins removed from their spindles and discharged into the bobbin receiver plates are discharged into the bobbin case from prescribed heights by means of a raising and lowering device. That the foregoing bobbin exchanging operations are moreover accomplished under a prescribed program without loss of time surely constitutes a new invention that was hitherto unknown. In addition, the carrying out of operations such as hereinbefore described by utilizing a single power source and switching between the power for the travel of the KAD and that for the operation of bobbin exchanging is a heretofore unknown feature.

Thus, in equipping a spinning mill with the invented KAD there is no need to change the heretofore used intervals between the spinning machines, and since the exchange of the bobbins is not carried out from above the spinning machines, there is no need to raise the ceiling of the plant nor need provisions for an overhead traveling apparatus be made. Hence, the alterations in the plant equipment can be accomplished at very small expense.

Although the apparatus and method, as hereinbefore described, constitutes a unique and novel invention, it is not intended to restrict the invention to the embodiments illustrated and described but to include all modifications and variations within spirit of the invention and scope of the appended claims.

What is claimed is:

1. An automatic bobbin doffing apparatus for a textile machine, comprising driving means, travel means coupled to the driving means for causing the apparatus to travel along the front of the textile machine, stopping means coupled to said driving means for stopping said driving means to stop the apparatus accurately at prescribed positions relative to said textile machine, lappet reversing means coupled to said driving means, bobbin loosening means coupled to said driving means, bobbin removing means coupled to said driving means for removing a plurality of full bobbins simultaneously from spindles of the textile machine, bobbin receiver raising and lowering means coupled to said driving means for lowering the removed bobbins loaded on bobbin receivers and discharging said removed bobbins at the bottom point of the descent of said raising and lowering means, and bobbin supplying means coupled to said driving means for simultaneously mounting a plurality of empty bobbins on the spindles and from which the full bobbins have been removed, said bobbin supplying means moving said empty bobbins from their horizontal position along a curve to a substantially vertical position, and control means for controlling the operation of said aforementioned means for actuating them in the sequence in which they are set forth.

2. An apparatus according to claim 1 wherein said lappet reversing means comprises a plurality of nonmagnetic push-up rods having permanent magnets thereon, said rods being disposed at equidistant intervals, and means for pushing up said push-up rods, whereby said magnets attract the lappets and space is cleared for the passage of the bobbins.

3. An apparatus according to claim 1 wherein said bobbin loosening means comprises a rack, a channel-shaped bar having a channel therein in which said rack slides, push-up levers having a pinion portion at their one ends which engages said rack, said levers being disposed at equidistant intervals and pivotally mounted on said channel-shaped bar and adapted to project outwardly from the channel when said rack is pressed and slidingly moved by a push rod, and means for rotating said channel-shaped bar about its axis, whereby the tips of the projecting push-up levers push up the bottoms of the bobbins.

4. An apparatus according to claim 1 wherein said means for simultaneously removing a plurality of bobbins from spindles comprises a member having a plurality of openings through which the tops of bobbins are passable, said openings being disposed at equidistant intervals, a chucking bar having thereon arm members above each of said openings, said arm members having holes provided coaxially of said openings, spring biased tapered guide rods above said openings for pressing the tops of the bobbins by the biasing action and the bobbins can be discharged thereby, a sliding member slidably mounted along the underside of the chucking bar, an elastic member against which one end of said sliding member abuts, pressure means bearing against the other end of said sliding member, said sliding member having in portions corresponding to said openings elongated circular openings longer in dimension than said first-named openings in the longitudinal direction of said sliding member, fixed chucking elements fitted in the several openings of the chucking bar and movable chucking elements fitted to the several openings of the sliding member and opposed to said fixed chucking elements, whereby when the tops of the bobbins are inserted, the sliding member by being slidingly moved by the pressure means grips the bobbin tops.

5. A bobbin removing means according to claim 1 which comprises an independently rotatable arm member, a pinion disposed within said arm member, a common shaft on which said pinion and arm member are concentrically mounted, a rack in engagement with said pinion, said rack being slidable outwardly from said arm member along the axis thereof, another arm mounted so as to be independently rotatable concentrically of said common shaft, a link pivotally attached at one end thereof to said another arm, a fitting to which the other end of said link and the distal portion of said rack are pivotally attached, and said chucking bar at at least one end is connected to said fitting.

6. A bobbin removing means according to claim 5 wherein the rack and the link drive the two points on said fitting to which they are pivoted in a cycle respectively about the loci described by a first closed curve and a differing second closed curve.

7. An apparatus according to claim 1 wherein said bobbin receiver raising and lowering means comprises a gang of receiver plates consisting of a plurality of juxtaposed sets of receiver plates, each set being two plates disposed such that the short sides thereof form a V shape and the long sides thereof at the side adjacent to the adjoining set being hinged with its counterpart of said adjoining set, a slidable saddle, a vertically slidable rotating shaft to which said saddle is coupled, cams fitted to said slidable saddle and adapted to be rotatable clockwise and anticlockwise by means of the reciprocative movement of said slidable saddle whereby only the plates inclined in the same direction of said gang of receiver plates are rocked simultaneously, means for raising and lowering the gang of receiver plates carrying the bobbins, and discharging means adapted to discharge said bobbin at the lowered position of the receiver plates in a prescribed direction by opening the same side only of the several sets of said receiver plates by means of the reciprocative movement of the slidable saddle resulting from the rotation of said vertically slidable rotating shaft.

8. A bobbin receiver raising and lowering means according to claim 7 which is provided with an ascent and descent stroke changing means comprising a pair of identically shaped cylindrical cams disposed in parallel, tubular shafts about which said cams are rotatable synchronously and at the same speed, the cam surface provided on said cams being such that the vertexes of triangles of identical development configuration lie on the same side, a circuit for lowering, a circuit for raising and a circuit for discharging of the raising and lowering means, three switches connected to said circuits and positioned adjacent said shafts, said switches being capable of contacting said triangular surfaces, and means for gradually changing the descending stroke of the bobbin receiver by moving said switches along the tubular shafts to change the time of contact of the switches with the cam surfaces.

9. An apparatus according to claim 1 wherein said bobbin supplying means comprises a connecting beam having a narrowed channel entry, a slidable push rod extending longitudinally through said channel, a plurality of bobbin catchers juxtaposed on said connecting beam at right angles to the axis of said beam and having bosses on the ends thereof, a plurality of bobbin holders whose one ends are secured to said push rod and which in cooperation with the several catchers holds the bobbins, a first shaft on which are pivotally mounted the bosses at the one ends of the several catchers, an arm one end of which is pivotally mounted on said shaft, a common rotating shaft on which the other end of said arm is pivotally mounted, a second shaft parallel with the first shaft, ascending and descending arms pivotally mounted on said second shaft and adapted to swing downwardly about said second shaft, fixed guide cams disposed below said arms and engaged by said arms when the arms are in the lowermost position, rollers provided at intermediate points on the connecting beam on that side opposite to the side on which the catchers are disposed, and means for rotating said first, common rotating, and second shafts in the same direction to cause the rollers to move down over the ascending and descending arms and the fixed guide cams, and catchers to move from their horizontal position to a vertical position and thereafter the push rod to be pushed to move the bobbin holders whereby the bobbins are impaled on the spindles.

10. An apparatus according to claim 1 wherein said bobbin supplying means comprises a roller shaft, a plurality of eccentric rollers on the roller shaft, a truncated conical roller disposed below said plurality of eccentric rollers, a rotating shaft parallel to the roller shaft on which said conical roller is mounted, said rollers being spaced from said conical roller a distance less than the diameter of an empty bobbin, said conical roller having at least one groove in its curved surface, the speed at which the curved surface rotates being less than that of the curved surface of the eccentric rollers, a bobbin storage case having two deep channels disposed below said conical roller and said deep channels having bobbin holders therein simultaneously opening and closing in the opposite directions for holding and discharging the bobbins, said groove of the conical roller being such that the axes of the roller and bobbin are in parallel when a bobbin is carried in the groove with its top in that part of the groove at the larger-diameter-end of the roller and its bottom in that part of the groove at the smaller-diametered end thereof, the configuration of the groove being such that a bobbin carried therein while the conical roller is rotating in its rotating direction is readily carried upwardly along with the conical roller as it rises and is readily discharged as it descends, whereby the bobbins are supplied to said deep channels via said groove.

11. A bobbin supplying means according to claim 10 wherein a separating plate is provided above said truncated conical roller in spaced relationship therewith, said separating plate being so disposed that the passage of a bobbin carried in the groove of the curved surface of said conical roller is not impeded, but a bobbin atempting to pass by traveling along the outer periphery of the conical roller is prevented from passing.

12. A bobbin supplying means according to claim 10 wherein the truncated conical roller has a pair of grooves in its curved surface symmetrically of the roller axis, and cruciform vaned wheels disposed between said roller and the carriers, said vaned wheels having vanes forming angles of equal magnitude between the vanes, shafts parallel to the roller shaft on which said vaned wheels are mounted, said vaned wheels being coupled to the driving means so that, while the roller makes one rotation, they make a quarter rotation thereby supplying to the carriers the empty bobbins received from the former.

13. An apparatus according to claim 1 in which said stopping means for stopping the apparatus at prescribed positions, comprises a discoidal cam having a groove about its periphery, part of which is cut away, a driven shaft on which said cam is mounted, said driven shaft being coupled to said driving means and driven from a prescribed rotative position, the groove of said cam having a configuration which flares at that part where the cam starts its rotation, the flared part facilitating the engagement of said cam with boat-shaped fingers mounted on the frame of a ring spinning machine.

14. Stopping means as claimed in claim 13 comprising a pair of intermittent gears, a driving shaft on which one of said gears is mounted and a driven shaft on which the other of said gears is mounted in engagement with said first-named gear, the number of teeth on both said first and second-named gears being the same, whereby when the intermittent portions of the two gears are in mutual contact, the driven shaft continues to remain stopped even though the driving shaft rotates, if within a prescribed angle whereby the driven shaft starts being driven at all times from a fixed rotative position.

References Cited

UNITED STATES PATENTS

| 1,572,103 | 2/1926 | Buchanan | 57—53 |
| 1,795,300 | 3/1931 | Evcichjevitz | 57—53 |
| 2,653,440 | 9/1953 | Partington | 57—53 |
| 3,123,967 | 3/1964 | Ingham | 57—52 |

FRANK J. COHEN, *Primary Examiner.*

J. PETRAKES, *Assistant Examiner.*